United States Patent
Takahashi et al.

(10) Patent No.: US 6,650,629 B1
(45) Date of Patent: Nov. 18, 2003

(54) METHOD AND SYSTEM FOR TERMINAL COMMUNICATION

(75) Inventors: Yousuke Takahashi, Yokohama (JP); Kazuhito Ishida, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/479,785

(22) Filed: Jan. 7, 2000

(30) Foreign Application Priority Data

Jan. 7, 1999 (JP) ............................................. 11-001673

(51) Int. Cl.[7] ................................................. H04B 7/216
(52) U.S. Cl. ........................ 370/335; 370/342; 370/441; 455/517
(58) Field of Search ............................... 370/310.2, 313, 370/320, 328, 331, 335, 342, 441, 447, 479, 485, 504; 455/422, 517; 375/130, 140, 141, 146, 147

(56) References Cited

U.S. PATENT DOCUMENTS

| | | | | |
|---|---|---|---|---|
| 5,515,366 A | | 5/1996 | Chieu et al. | 370/50 |
| 5,715,295 A | * | 2/1998 | Yamashita | 455/455 |
| 5,771,463 A | * | 6/1998 | Lehmusto et al. | 455/524 |
| 5,822,682 A | * | 10/1998 | Schroderus et al. | 455/63 |
| 5,943,322 A | * | 8/1999 | Mayor et al. | 370/280 |
| 5,983,099 A | | 11/1999 | Yao et al. | 455/426 |
| 5,987,076 A | | 11/1999 | Zchavi et al. | 375/340 |
| 5,995,500 A | * | 11/1999 | Ma et al. | 370/337 |
| 6,047,178 A | * | 4/2000 | Frlan | 455/423 |
| 6,278,703 B1 | * | 8/2001 | Neufeld | 370/342 |
| 6,289,218 B1 | * | 9/2001 | Liu | 455/426 |
| 6,415,149 B1 | * | 7/2002 | Bevan et al. | 455/442 |
| 6,442,372 B1 | * | 8/2002 | Laham et al. | 455/67.1 |

FOREIGN PATENT DOCUMENTS

| | | |
|---|---|---|
| JP | 5-102921 | 4/1993 |
| JP | 6-296163 | 10/1994 |
| JP | 8-204682 | 8/1996 |
| JP | 8-294170 | 11/1996 |

\* cited by examiner

*Primary Examiner*—Ricky Ngo
*Assistant Examiner*—Christopher M Swickhamer
(74) *Attorney, Agent, or Firm*—Knoble & Yoshida, LLP

(57) ABSTRACT

In the CDMA environment, a local call is directly made between two mobile stations (MS) without the involvement of a base station. The local direct calls do not interfere with any existing communication lines, and the implementation on the CDMA based units includes Master MS units and Slave MS units which selects one of currently unused offset values in a pilot signal for a local direct call in the CDMA environment.

29 Claims, 17 Drawing Sheets

FIG. 9A  PILOT SIGNAL TRANSMITTED BY BASE STATION FOR PROVIDING MOBILE COMMUNICATION SERVICE
FIG. 9B  1st METHOD OF TERMINAL CALL PILOT AND 2nd METHOD OF BETWEEN TERMINAL COMMUNICATION BOTH PILOT TRANSMITTED BY MASTER TERMINAL
FIG. 9C  1st METHOD OF IN COMMUNICATION DISPLAY PILOT TRANSMITTED BY MASTER TERMINAL

FIG. 10

OVERHEAD INFORMATION

| FIELD | LENGTH (BITS) |
|---|---|
| MSG_TYPE('00000001') | 8 |
| MASTER_ID_INCLUDED | 1 |
| DIGIT_MODE | 0 or 1 |
| NUM_FIELDS | 0 or 8 |

NUM_FIELDS OCCURRENCES OF THE FOLLOWING FIELD IF MASTER_ID_INCLUDED IS SET TO '1':

| CHARi | 4 or 8 |
|---|---|

| SLAVE_ID_INCLUDED | 1 |
|---|---|
| DIGIT_MODE | 0 or 1 |
| NUM_FIELDS | 0 or 8 |

NUM_FIELDS OCCURRENCES OF THE FOLLOWING FIELD IF SLAVE_ID_INCLUDED IS SET TO '1':

| CHARi | 4 or 8 |
|---|---|

| LC_STATE | 42 |
|---|---|
| SYS_TIME | 36 |
| RESERVED | AS NEEDED |

MASTER_ID_INCLUDED: 1 INDICATES THE INCLUSION OF MASTER MS PHONE NUMBER WHILE 0 INDICATES OTHERWISE

DIGIT_MODE: 0 INDICATES PHONE NO. IN DTMF CODE WHILE 0 INDICATES IN ASCII CODE

NUM_FIELDS: NUMBER OF LINES FOR PHONE NUMBERS

CHARIi: PHONE NUMBER EXPRESSED BY DIGHT_MODE

SLAVE_ID_INCLUDED: 1 INDICATES THE INCLUSION OF SLAVE MS WHILE 0 INDICATES OTHERWISE

LC_STATE: LONG CODE STATUS USED BY TIME INDICATED BY SYS_TIME

SYS_TIME: SYSTEM TIME

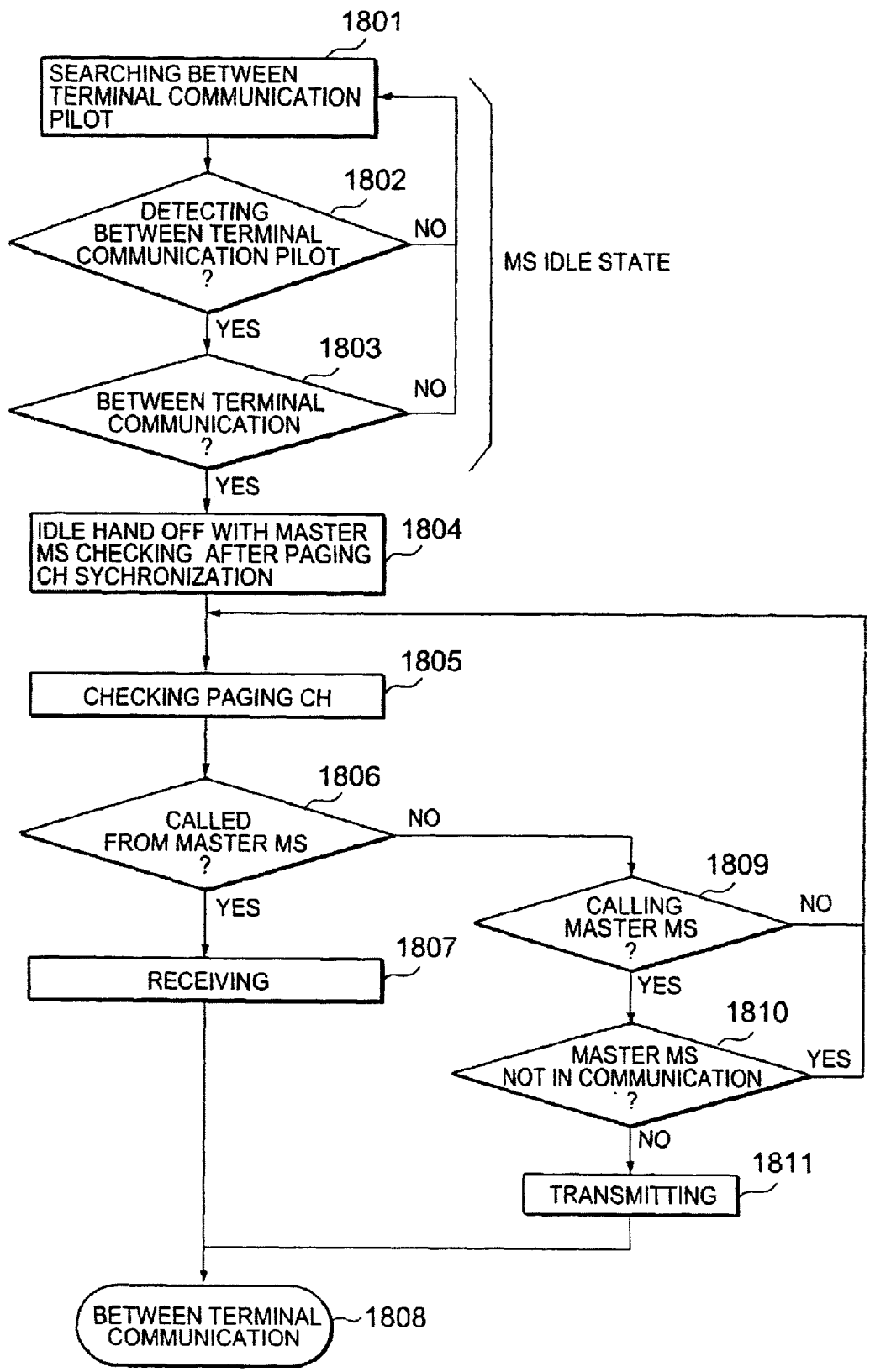

METHOD AND SYSTEM FOR TERMINAL COMMUNICATION

FIELD OF THE INVENTION

The current invention is generally related to terminal communication, and more particularly related to the terminal communication method and system for a code division multiple access protocol.

BACKGROUND OF THE INVENTION

In wireless or radio communication systems, in order for one caller to talk to another, mobile or portable communication units are temporarily connected via at least one base station. If a calling mobile unit is located inside a service area of one base station and a receiving mobile unit is located inside a service area of another base station, at least two base stations are involved in transmitting information between the two mobile units. On the other hand, if two mobile units are located in the same service area, one base station is involved. Since a large number of calls is local or within the same service area, the resources at a base station are heavily utilized by these local calls. In order to preserve the capacity to handle calls at the base station, in prior attempts, local calls are made directly between the two mobile communication units without going through a base station. To understand how these direct local calls between the two mobile communication units are made, one has to understand multiple access techniques that are used in wireless communication systems.

Multiple access techniques generally increase the capacity in number of concurrent communication lines between any two mobile communication terminals such as cellular telephones. One multiple access technique is time division multiple access (TDMA). The TDMA technique in general limits an amount of access time for each terminal communication unit so that a number of concurrent calls between terminal communication terminal units increases. TDMA may require that each cell to have a different frequency. Another system is based upon a code division multiple access (CDMA) technique which shares the same frequency among communication units but uses a unique code or function such as a Walsh code for each communication line to digitize data. In general, the coded digital communication signals use quasi-orthogonal bit sequences to decrease mutual interference when they are summed for transmission. Because of the above digital coding, user capacity is increased.

For the direct communication between mobile units using a TDMA technique, U.S. Pat. No. 5,515,366 or the corresponding Japanese Patent Laid Publication Hei 8-204683 discloses the use of time slots that are not used by the communication between a base station and actively communicating mobile units. Although the use of unused time slots is possible for the direct local communication between mobile units, a number of such direct local calls in one service area is limited. This is because when a plurality of the direct local calls takes place within the same service area, it is a complex task for the mobile units to find the available time slots in a coordinated manner.

Similarly, Japanese Patent Laid Publication Hei 8-294170 disclosed direct local calls between mobile units in the personal handy phone system (PHS), which utilizes unstable cyclic channel scanning. Because the PHS system uses the time division duplex, a precise timing technique is necessary and as the distance between the two mobile units in direct communication increases, a larger amount of guard time is also necessary. The long guard time does not allow a large number of concurrent direct local calls within the same service area.

Furthermore, Japanese Patent Laid Publication Hei 6-296263 and Hei 5-102921 disclose other direct communication between terminal devices such as a hand held cordless phone unit and a base unit.

The CDMA techniques have been used in the IS-95 standard, which has been adapted by the Telecommunications Industry Association. In accordance with the IS-95 standard, a terminal communication unit such as a cellular telephone establishes a bi-directional link with one or more base stations via the use of radio frequency electromagnetic signals. Each bi-directional link consists of a forward link which is transmitted at one frequency by the base station to the mobile terminal unit and a reverse link which is transmitted at another frequency by the mobile terminal unit back to the base station. In other words, the bi-directional link is frequency division duplex (FDD). Each base station transmits a pilot signal having a common pseudo-random noise (PN) spreading a code that is offset in code phase from the pilot signal of other base stations. Although current terminal communication units using the CDMA technique alone cannot be used for the above described direct local calls, these terminal communication units can be used as a part of the direct local call systems without affecting or modifying the current CDMA-based IS-95 standard.

It is desired to promote direct local calls between mobile communication units in the CDMA-based system so as to reduce the load on a base station to handle cellular calls. As a result, the capacity for the user calls in the CDMA-based system will increase.

SUMMARY OF THE INVENTION

In order to solve the above and other problems, according to a first aspect of the current invention, a method of providing an optional direct communication between terminal communication units according to code division multiple access which is also used for communication between the terminal communication units via a base station in a communication network, includes the acts of: determining currently used identification information for the code division multiple access surrounding a first terminal communication unit, the identification information being assigned from a set of predetermined unique identifiers; selecting an unused one of the predetermined unique identifiers as a temporary unique identifier for direct communication between the first terminal communication unit and a second terminal communication unit; and establishing the direct communication between the first terminal communication unit and the second terminal communication unit according to the code division multiple access using the temporary unique identifier.

According to a second aspect of the current invention, a system for providing an optional direct communication between terminal communication units according to code division multiple access which is also used for communication between the terminal communication units via a base station in a communication network, including the acts of: attempting to establish direct communication between a first terminal communication unit and a second terminal communication unit according to the code division multiple access; and based upon the attempt, establishing communication between the first terminal communication unit and the second terminal communication unit via the base station in the communication network.

According to a third aspect of the current invention, a system for providing an optional direct communication between terminal communication units according to code division multiple access which is also used for communication between the terminal communication units via a base station in a communication network, includes: a first terminal communication unit for determining currently used identification information for the code division multiple access surrounding the first terminal communication unit, the identification information being assigned from a set of predetermined unique identifiers, the first terminal communication unit selecting an unused one of the predetermined unique identifiers as a temporary unique identifier; and a second terminal communication unit capable of communicating with the first terminal communication unit via the base station, the first terminal communication unit and the second terminal communication unit establishing the direct communication between the first terminal communication unit and the second terminal communication unit according to the code division multiple access using the temporary unique identifier.

According to a fourth aspect of the current invention, a system for providing an optional direct communication between terminal communication units according to code division multiple access which is also used for communication between the terminal communication units via a base station in a communication network, includes: a first terminal communication unit attempting to establish direct communication between the first terminal communication unit and a second terminal communication unit according to the code division multiple access; and in response to a failure in the attempt, a base station located near the first terminal communication unit and the second terminal communication unit establishing communication between the first terminal communication unit and the second terminal communication unit via the base station in the communication network.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIGS. 9(a), 9(b) and 9(c) are some examples for pilot signals.

FIG. 10 is a table containing exemplary overhead information which is transmitted in the synch channel from the Mater MS unit to the slave MS unit while a local direct call is being established.

FIG. 18 is a flow chart illustrating acts involved in a second preferred process of optionally establishing a direct local call between mobile terminals at a Slave MS unit according to the current invention.

DETAILED DESCRIPTION OF THE PREFERRED EMBODIMENT(S)

Figure 1:
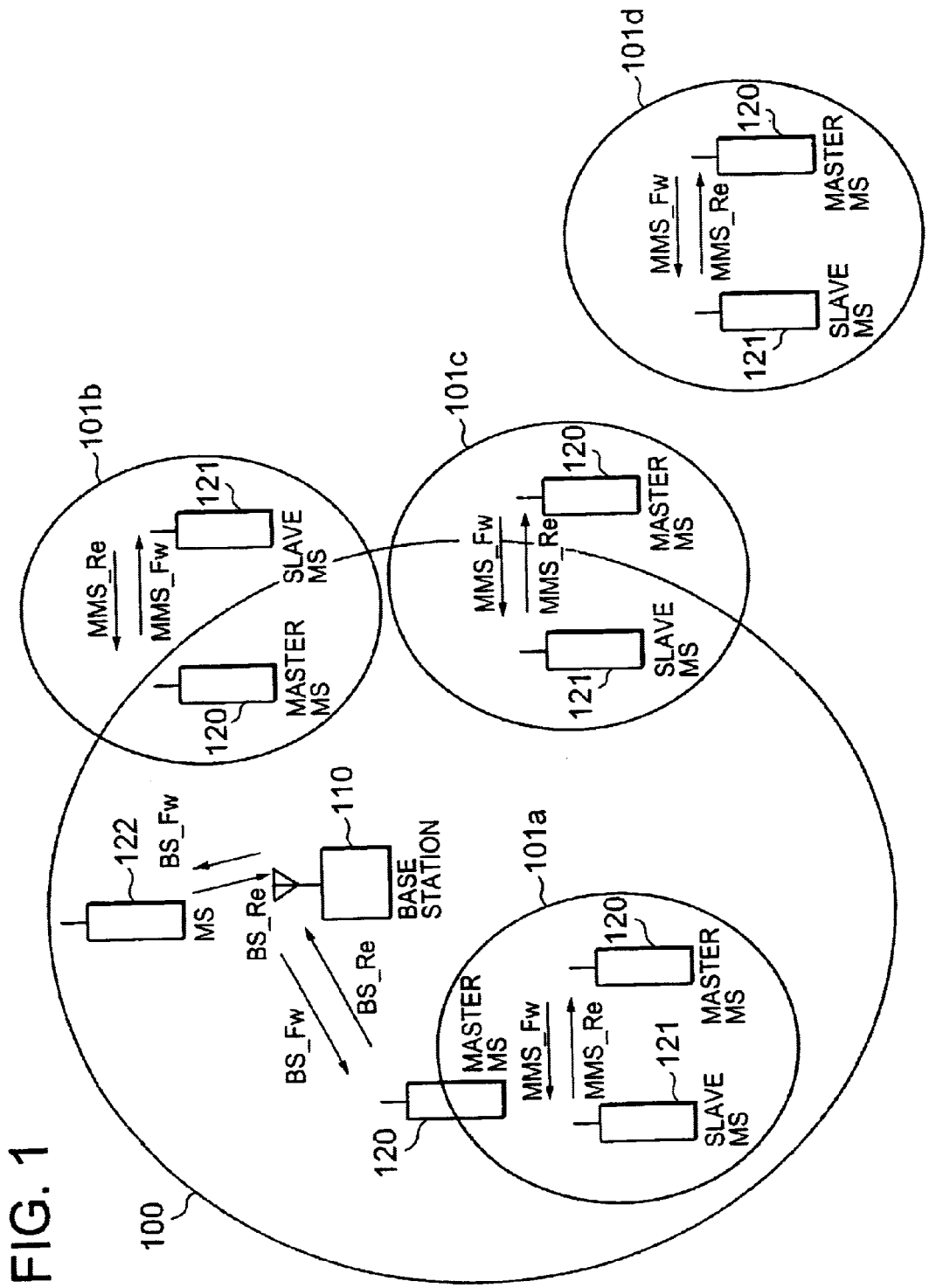
FIG. 1 is a block diagram illustrating one preferred embodiment of the wireless IS-95 standard telecommunication system to provide an option to make a direct local calls between mobile units according to the current invention.

Referring now to the drawings, wherein like reference numerals designate corresponding structure throughout the views, and referring in particular to FIG. 1, one preferred embodiment of the wireless or radio IS-95 standard telecommunication system to provide an option to make a direct local calls between mobile units is illustrated according to the current invention. The preferred embodiment includes a base station (BS) 110 and three types of mobile stations (MS) or terminal communication units 120, 121, 122. The BS 110 offers the mobile telecommunication service for covering a service area 100 where it can transmit a base station forward link (BS_Fw) to MS units and receives a base station reverse link (BS_Re) from the MS units. A mobile station (MS) 122 is a unmodified terminal communication unit that is used in normal CDMA-based IS-95 communication and is located inside the service area 100. The MS 122 receives the BS_Fw from the BS 110 while it transmits the BS_re to the BS 110.

Still referring to FIG. 1, one preferred embodiment of the wireless telecommunication system with an option to make a direct local calls according to the current invention further includes a master mobile station (Master MS) 120 and a slave mobile station (Slave MS) 121. The Master MS 120 receives the BS_Fw from the BS 110 while it transmits the BS_re to the BS 110. In addition, the Master MS 120 is equipped to transmit a master mobile station forward link (MMS_Fw) to the Slave MS 121 within a Master MS boundary areas 101a, 101b, 101c and 101d. The Master MS 120 is also equipped to receive a master mobile station reverse link (MMS_Re) from the Slave MS 121. The MMS_Fw contains a pilot signal indicating that it is for a direct local communication channel between two mobile stations. The Slave MS 121 is designed to interact with the Master MS 120 during the local direct communication. If the Slave MS 121 is also capable of initiating a local direct call, the Slave MS 121 is functionally and structurally identical to the Master MS 120. In the identical units, the functions and structures in the MS 120, 121 are switched between a master mode and a slave mode by software. In the alternative, if the Slave MS 121 is not capable of initiating a local direct call, the Slave MS 121 may lack certain functions and structures of the Master MS 120.

The above described terminal-to-terminal direct communication takes place inside as well as outside the base station service area 100. The Master MS 120 and the Slave MS 121 are both located in the base station service area 100 when the Master MS 120 transmits signals within the Master MS boundary areas 101a. The Master MS 120 is located within the base station service area 100 while the Slave MS 121 is located outside the base station service area 100 when the Master MS 120 transmits signals within the Master MS boundary areas 101b. In contrast, the Master MS 120 is located outside the base station service area 100 while the Slave MS 121 is located within the base station service area 100 when the Master MS 120 transmits signals within the Master MS boundary areas 101c. Lastly, the Master MS 120 and the Slave MS 121 are both located outside the base station service area 100 when the Master MS 120 transmits signals within the Master MS boundary areas 101d.

In general, in order to establish a local direct calls between the Master MS 120 and the Slave MS 121, FIG. 1 illustrates that the Master MS 120 transmits a terminal call pilot or a master mobile station pilot signal (MMS pilot) within Master MS boundary area 101a–d. Conceptually speaking, by the Slave MS 121, the Master MS 120 is perceived as another base station which transmits a terminal call request pilot signal. In other words, the Master MS 120 does not require the Slave MS 121 to operate in a substantially different manner in responding to the terminal call pilot signal. After the local direct call is established between the Master MS 120 and the Slave MS 121, the same Mater MS 120 transmits a in-communication display pilot signal instead of the MMS pilot so that the local direct communication is not interfered by other Master MS units.

Figure 2:
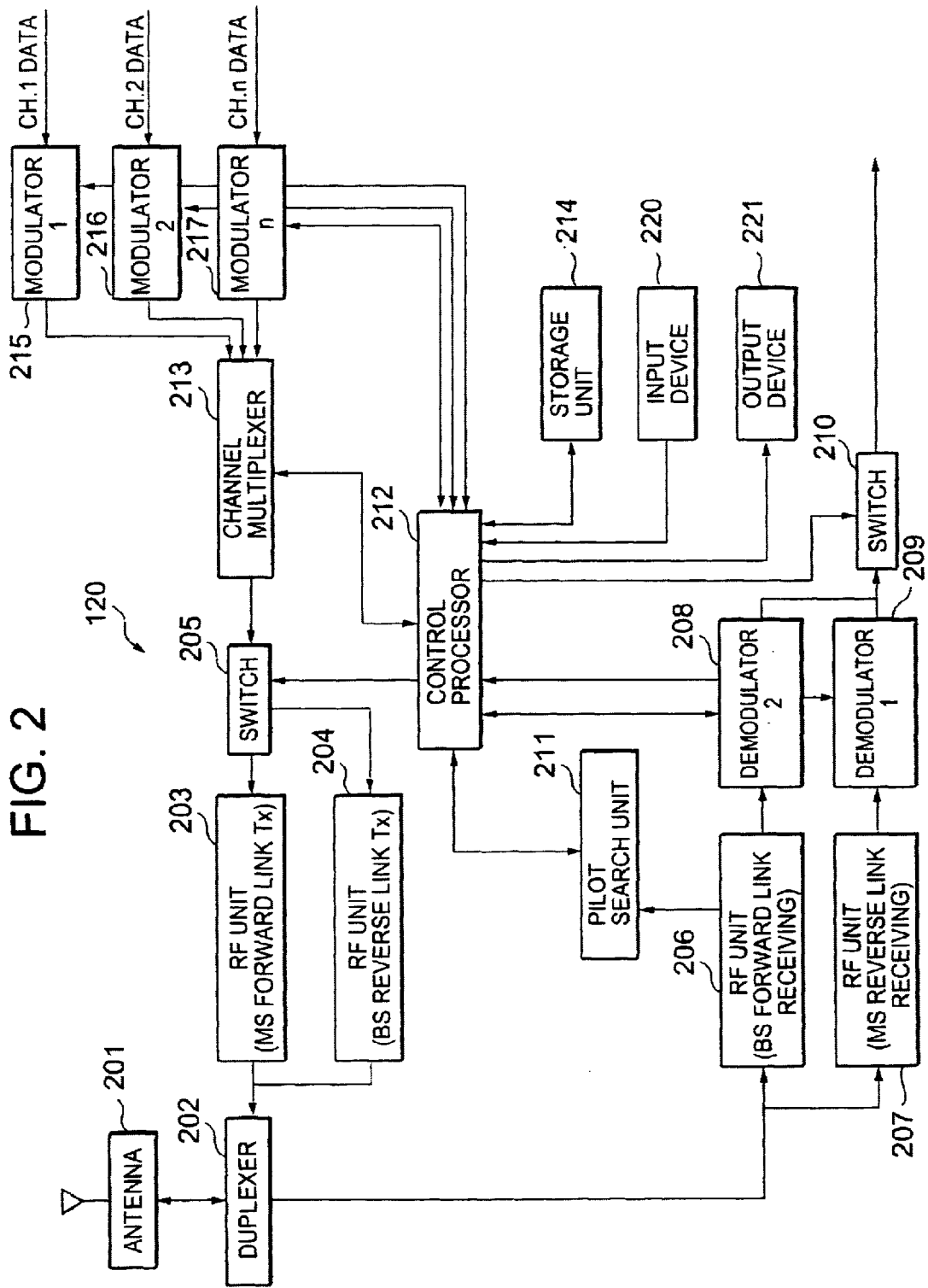
FIG. 2 is a block diagram illustrating one preferred embodiment of the master mobile station (Master MS) according to the current invention.

Now referring to FIG. 2, a block diagram illustrates one preferred embodiment of the master mobile station (Master MS) 120 according to the current invention. An antenna 201 is used to transmit as well as to receive signals. In this regard, signals from a Master MS forward link transmitting RF unit 203 or a BS reverse link transmitting RF unit 204 are outputted to the antenna through a duplexer 202. Similarly, signals received by the antenna are outputted via the duplexer 202 to a BS forward link receiving RF unit 206 or a BS reverse link receiving RF unit 207. The Master MS 120 is equipped to transmit multiplexed channels. Transmission components of the Master MS 120 include the Master MS forward link transmitting RF unit 203, the BS reverse link transmitting RF unit 204, the switch 205, a control processor 212, a channel multiplexer 213, a storage unit 214, and modulators 215 through 217. Channels 1 through n are modulated by the corresponding modulators 215 through 217. The modulation during the local direct communication and that during the non-local communication are different, and the control processor 212 controls the modulation. The modulated output signals are now multiplexed by the channel multiplexer 213 and are sent to a switch 205. The control processor 212 controls the switch 205 to connect to the Master MS forward link transmitting RF unit 203 when the Master MS 120 is in a local direct call mode. On the other hand, the control processor 212 controls the switch 205 to connect to the BS reverse link transmitting RF unit 204 when the Master MS 120 is not making a local direct call or in a normal operating mode.

Still referring to FIG. 2, reception components of the Master MS 120 further include the BS forward link receiving RF unit 206, the BS reverse link receiving RF unit 207, demodulators 208, 209, a switch 210, a pilot search circuit 211, and the control processor 212. Signals from the antenna 201 via the duplexer 202 are inputted to the BS forward link receiving RF unit 206 and the BS reverse link receiving RF unit 207, and the output therefrom are respectively demodulated by the corresponding demodulators 208 and 209. The control processor 212 controls the switch 210 to connect to the demodulator 209 to output the signal from the Master MS reverse link receiving RF unit 207 when the Master MS 120 is in a local direct call mode. On the other hand, the control processor 212 controls the switch 210 to connect to the demodulator 208 to output the signal from the BS forward link receiving RF unit 206 when the Master MS 120 is not making a local direct call or in a normal operating mode. Furthermore, the BS forward link receiving RF unit 206 always outputs its reception signal to the pilot search unit 211 so that the pilot search unit 211 scans the pilot signal from a base station or from another master mobile unit to determine an offset value indicating a particular source. In addition, the Master MS 120 further includes an input device 220 such as a keyboard on a microphone for inputting commands and other information such as the name of a party to call. Similarly, the Master MS 120 also further includes an output device 221 such as a LCD display and a speaker to indicate the availability of the terminal-to-terminal communication.

Figure 3A:
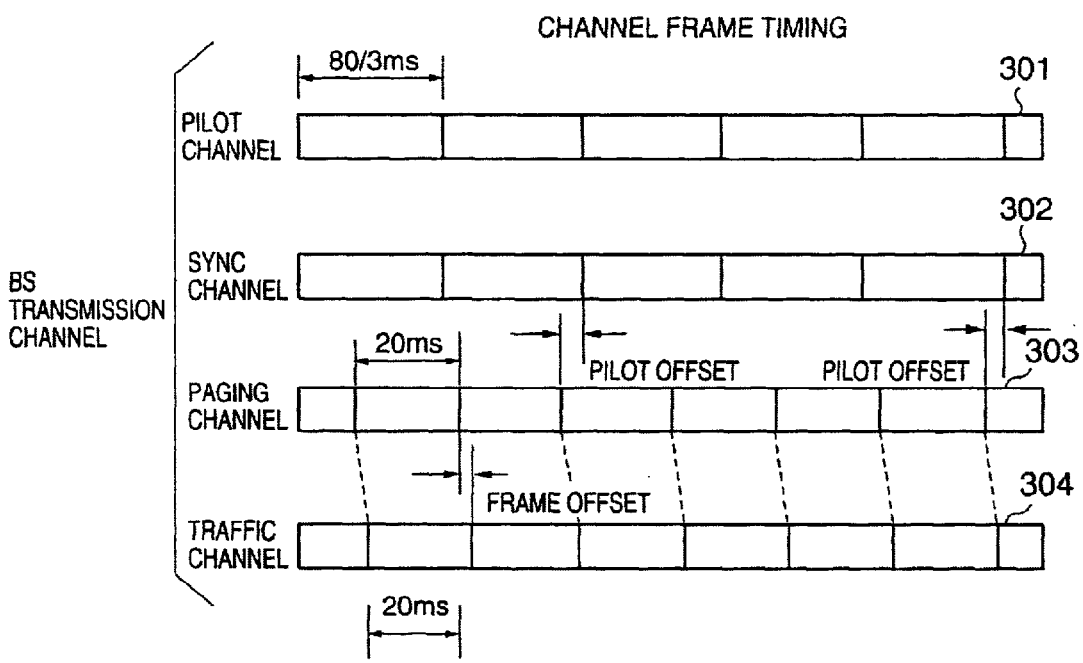
FIG. 3 is a diagram comparing the IS-95 channel frame timing to one preferred embodiment of a Master MS transmission channel according to the current invention.
Figure 3B:
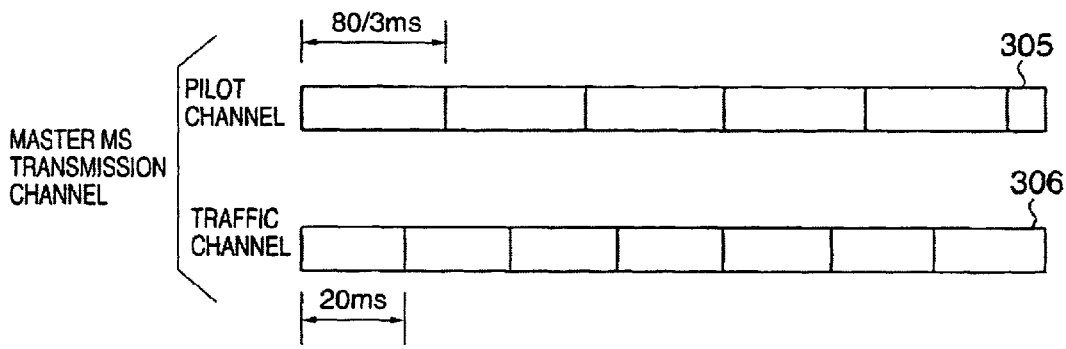

Now referring to FIG. 3, a comparison is made between the IS-95 channel frame timing as shown in (a) and one preferred embodiment of a Master MS transmission channel according to the current invention as shown in (b). FIG. 3(a) illustrates that the IS-95 BS forward link transmission channels include a pilot channel 301, a sync channel 302, a paging channel 303 and a traffic channel 304. Because the IS-95 standard uses pilot offsets and frame offsets, there are some misalignment in timing among the frames. In contrast to the IS-95 BS forward link channels as shown in FIG. 3(a), the preferred embodiment of the Master MS channels as shown in FIG. 3(b) are simplified and include a pilot channel 305 and a traffic channel 306. At the same time, in order to minimize any modification to a Slave MS units in implementing a direct local call, the timing and the frame length of the pilot channel 305 and the traffic channel 306 are compatible with those of the IS-95 protocol. In order to read from the channels from the Master MS forward link or the BS forward link, the Slave MS unit initially synchronizes with the pilot channel. The pilot channel according to the IS-95 protocol is spread by $2^{15}$ bits per 80/3 ms psuedo-random noises (PN), and the pilot channel 305 of the preferred embodiment also uses the same type of PN. The traffic channel 306 has the frame length of 20 ms, and the leading bit of every fourth frame is synchronously located at the leading bit of the PN. Since the bit length of the PN which spreads the pilot channel 305 differs from the frame length of the traffic channel 306, the Slave MS is not able to synchronize the traffic channel 306.

Figure 4:
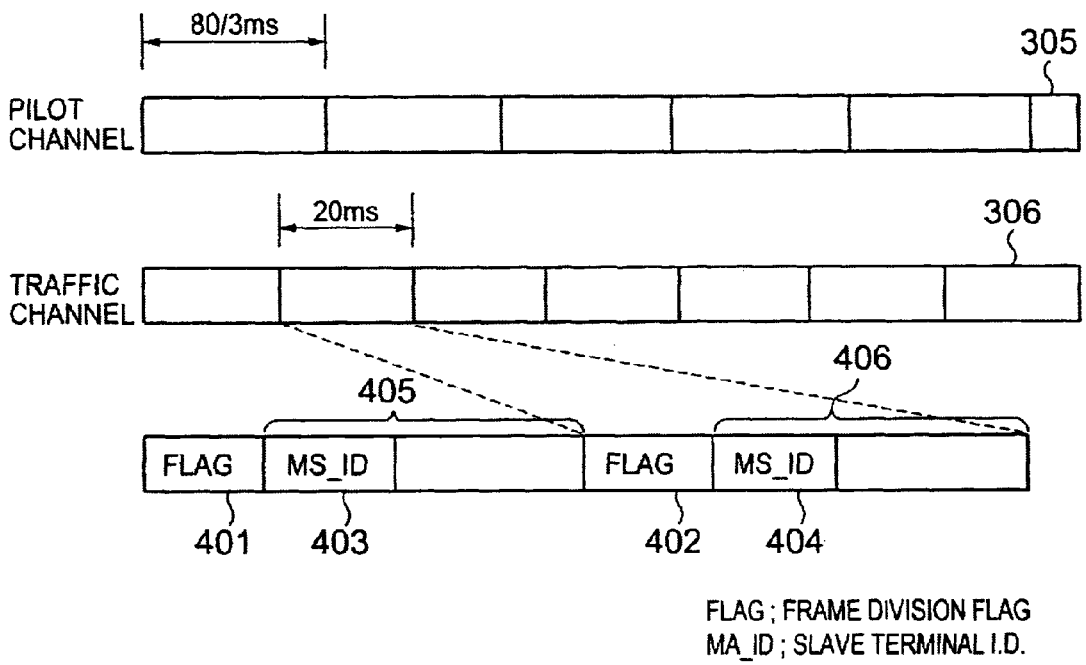
FIG. 4 conceptually illustrates one example for the synchronization technique to synchronize with the traffic channel.

In order to synchronize with the traffic channel, one example for the synchronization technique is conceptually illustrated in FIG. 4. Each frame of the traffic channel 306 includes a flag 401, 402 which is a specific sequence of bits for indicating a frame boundary. For example, the flag boundary is indicated by a specific bit sequence such as "01111110" Each traffic frame additionally apends a Slave MS ID (MS_ID) after the flag. If the flag is "01111110" and MS_ID is "00111111" assuming that the rest of the traffic frame is padded with zeroes, each traffic frame now contains "0111111000111111110000 . . . 000." However, since the flag and the MS_ID in the above example each contain six ones in a row, the flag and the MS ID cannot be distinguished. In order to resolve the above confusion, "zero insertion zero removal" processing according to the MTP2 protocol inserts a zero upon finding five zeroes in a row in a data area after the flag. The above exemplary traffic frame now becomes "011111100011111010000 . . . 000." This correct data assures the synchronization of the traffic channel by the specified flag. After the synchronization, the "zero insertion zero removal" now removes a zero bit in the data area after finding five consecutive one bits.

Figure 5:
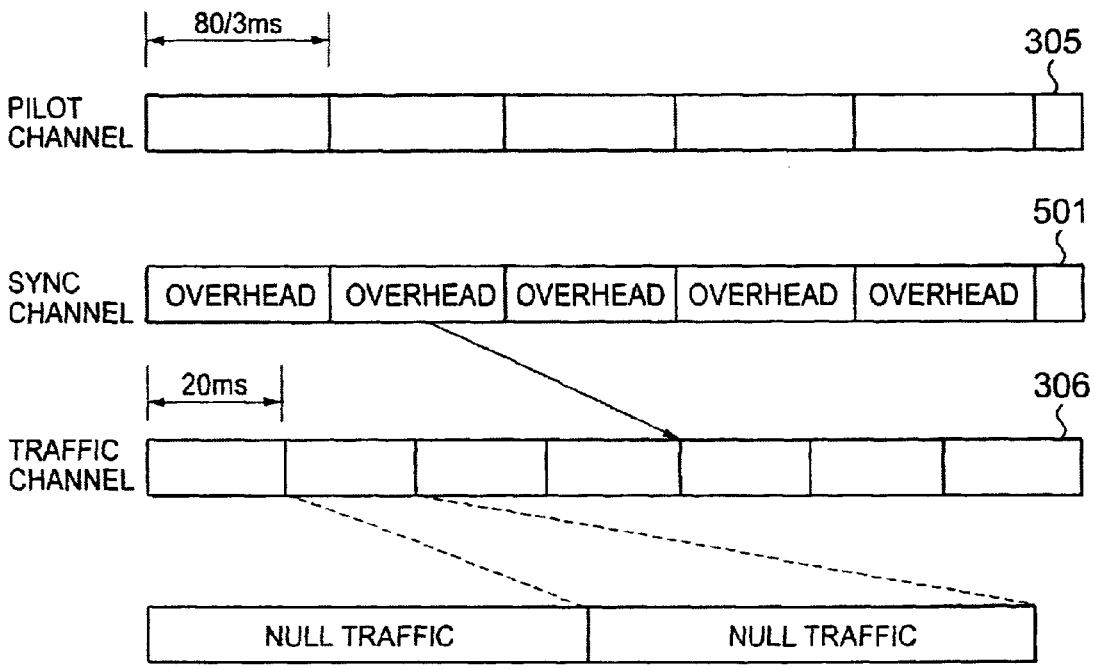
FIG. 5 also conceptually illustrates another method which utilizes an additional sync channel to synchronize with the traffic channel.

Now referring to FIG. 5 in addition to the above resolution method for synchronization, another method utilizes an additional sync channel 501. The frame length and the timing of the sync channel 501 are the same as those of the pilot channel 301. In order to synchronize the frames in the traffic channel 306, the Master MS unit transmits information on the traffic frame channel timing as a part of the overhead information in the sync channel 501. The timing information in the overhead points to the beginning of a traffic frame in the traffic channel 306. Although not shown in the drawings, the Master MS reverse link channel contains at least a terminal call response or a reply call as well as other communication information in the traffic channel. The frame length in the Master MS reverse link channel is also 20 ms.

Figure 6:
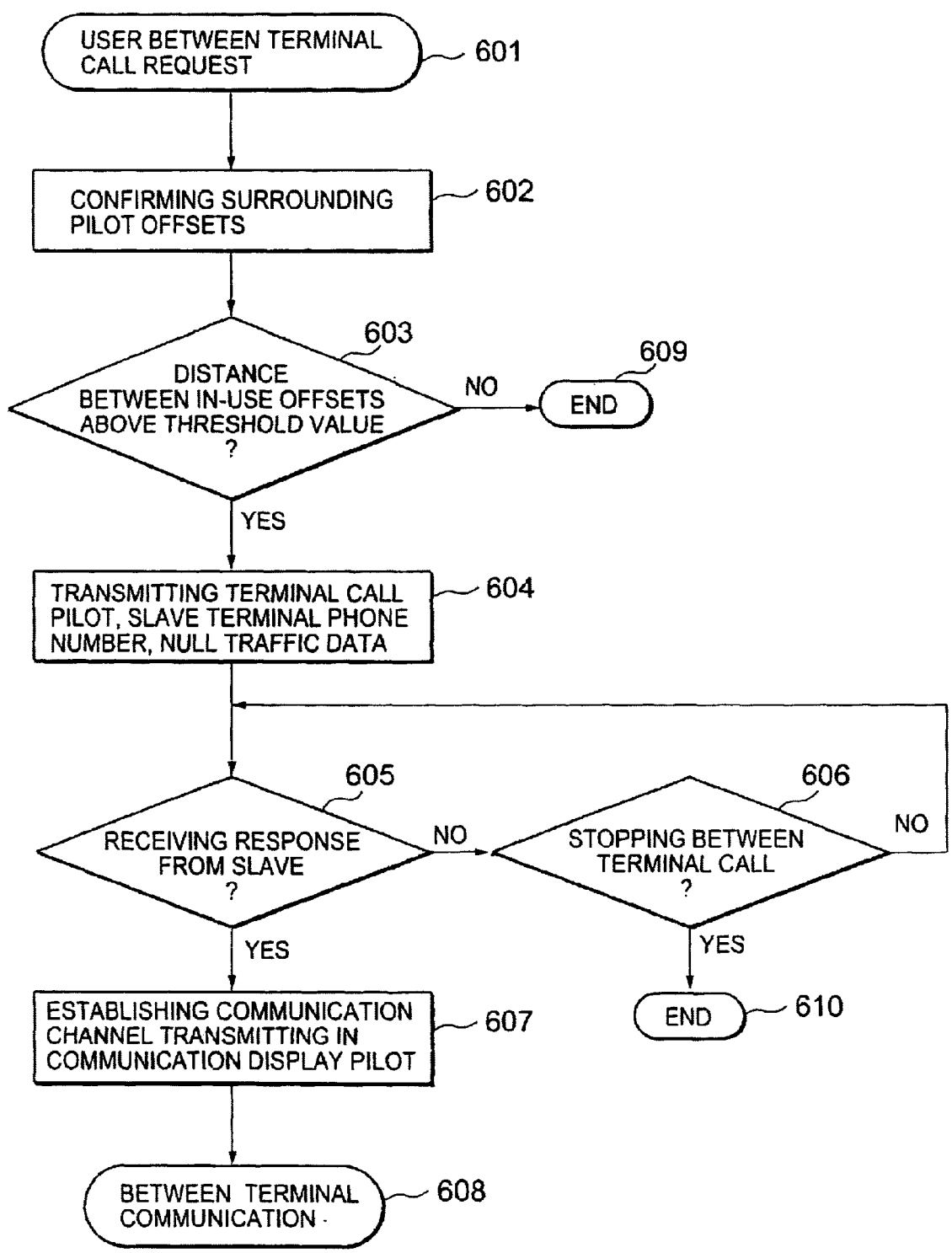
FIG. 6 is a flow chart illustrating acts involve in one preferred process of optionally establishing a direct local call between mobile terminals at a Master MS unit according to the current invention.

Now referring to FIG. 6, a flow chart illustrates acts involve in one preferred process of optionally establishing a direct local call between mobile terminals at a Master MS unit according to the current invention. Upon receiving a local direct terminal call request from a user in act 601, a Master MS unit determines currently used offset values in the pilot channel in the surrounding environment and stores in a memory unit the information on the used and unused offset values in act 602. In act 603, a control processor determines an offset interval value that indicates a distance between the selected one of the unused offset values and currently used offset values. The control processor further determines whether or not the distance is larger than a predetermined offset interval threshold value in an act 603. If the distance is not equal or above the predetermined offset interval threshold value, the preferred process indicates that no direct terminal call is available and ends in an act 609. The failing result may be audibly and or visually communicated to the user from the Master MS unit. On the other hand, if the distance is above the predetermined offset interval threshold value, using the selected unused offset value, the Master MS unit transmits a direct terminal call request pilot signal, Slave MS_ID data as well as Null Traffic data in an act 604.

Still referring to FIG. 6, the Master MS unit waits for a response signal or a confirmation signal in an act 605 after the terminal call pilot signal was transmitted. If there is no confirmation signal and it is determined to stop the attempt to establish the local direct call in an act 606, the preferred process ends in an act 610. However, if the attempt is to be continued, the preferred process goes back to the act 605. Upon receiving the confirmation signal in an act 605, a new direct call is established and the terminal call pilot signal is changed to an in-communication display pilot signal in an act 607. The local direct communication is continued in an act 608.

Figure 7:
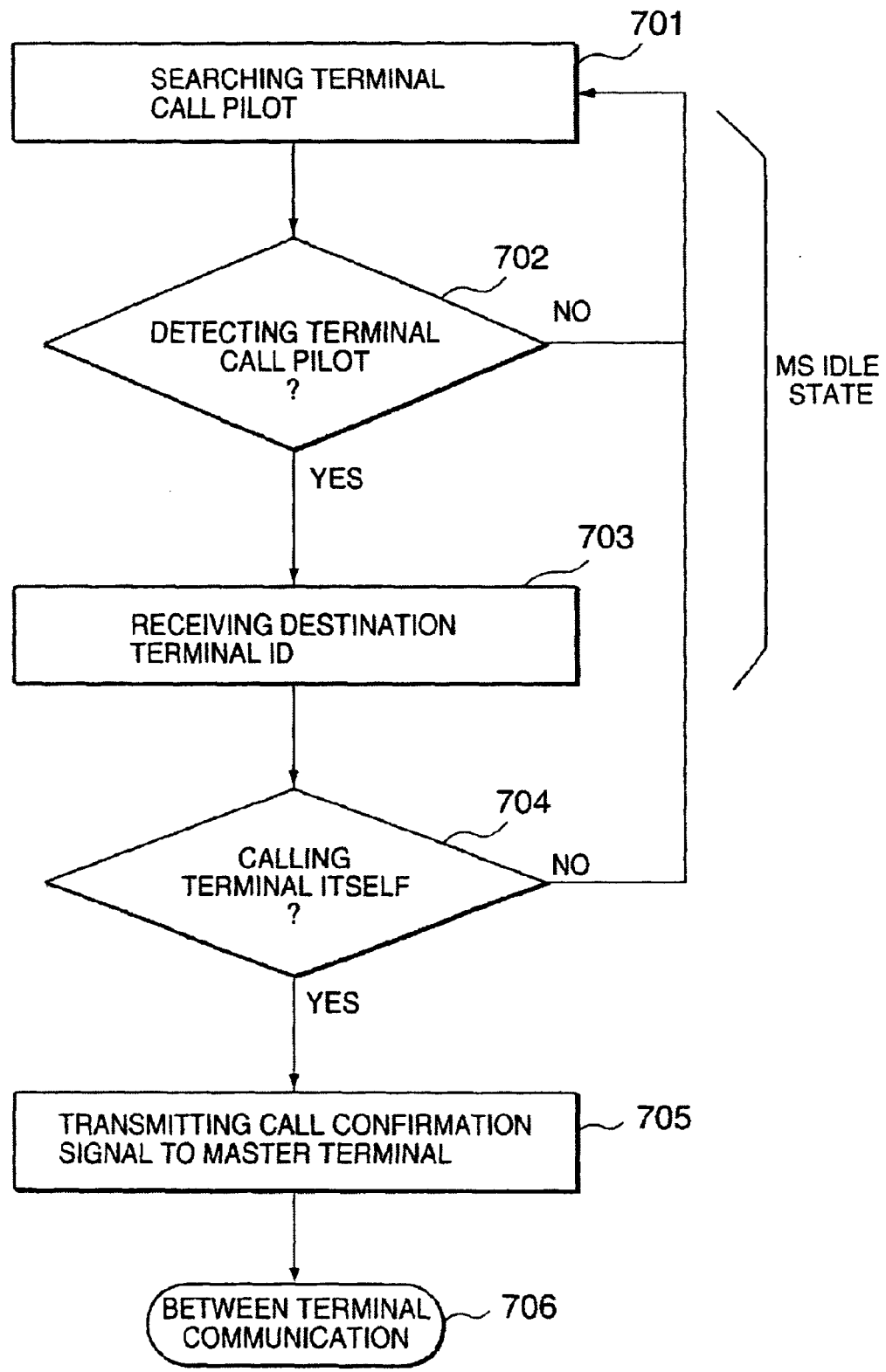
FIG. 7 is a flow chart illustrating acts involved in one preferred process of optionally establishing a direct local call between mobile terminals at a Slave MS unit according to the current invention.

Now referring to FIG. 7, a flow chart illustrates acts involved in one preferred process of optionally establishing a direct local call between mobile terminals at a Slave MS unit according to the current invention. Assuming that the Slave MS unit is able to distinguish a MMS pilot signal of a Master MS unit from a BS pilot signal of a base station, in a MS idle state, the Slave MS unit searches or scans for a terminal call pilot signal from the Master MS unit in an act 701. The search or scanning frequency is preferably less than the terminal call transmission frequency. Alternatively, the search frequency may be more than the terminal call transmission frequency if it is not periodic in order to preserve the battery life. Upon detecting the terminal call pilot signal in an act 702, a control processor determines which terminal is called based upon information in the Slave MS_ID data, which is contained in the terminal call pilot signal in an act 703. The control processor further determines in an act 704 whether or not the called slave MS_ID data matches the self-terminal identification data stored in a memory unit. If the slave MS_ID data does not match the self-terminal data, the preferred process returns to the MS idle state or to the act 701. On the other hand, if the slave MS_ID data matches the self-terminal data, the preferred process continues on to an act 705 where a reply or confirmation signal is transmitted to the Master MS unit. A local direct terminal call is established and is carried on in an act 706.

Figure 8:
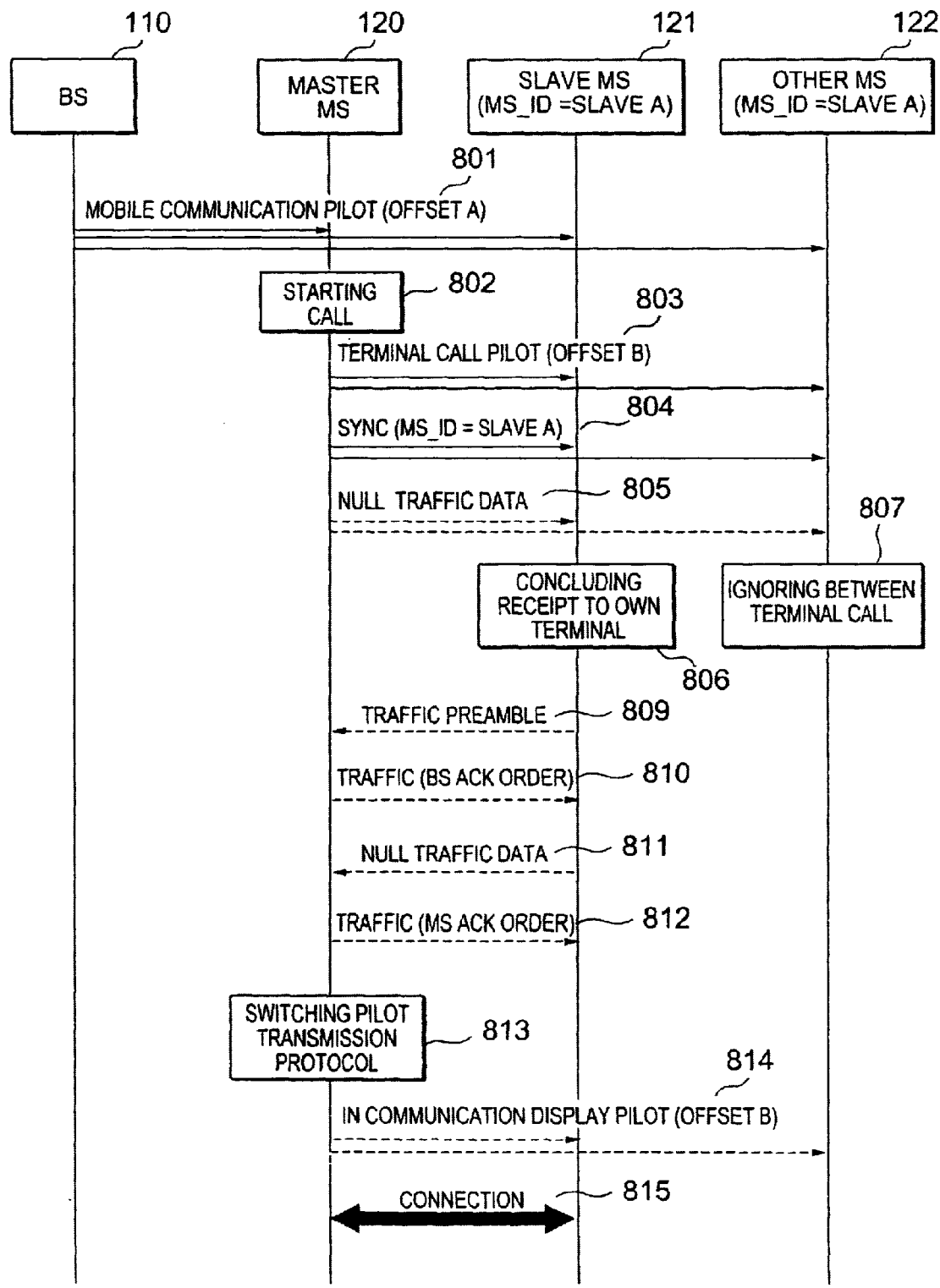
FIG. 8 is a pseudo timing chart illustrating chronological relationships of the acts at a Master MS unit and a Slave MS unit as described above with respect to the flow charts of FIGS. 6 and 7.

Now referring to FIG. 8, a pseudo timing chart illustrates chronological relationships of the acts at a Master MS unit and a Slave MS unit as described above with respect to the flow charts of FIGS. 6 and 7. This timing chart describes a situation where the Master MS unit 120 initiates a local direct call to the Slave MS unit 121 as shown in FIG. 1. In establishing the local direct call, the Master unit 120 and the Slave MS unit 121 use the Master MS forward link which includes the pilot channel signal, the sync channel signal, and the traffic channel signal as well as the Master MS reverse link which includes at least the traffic channel signal as described with respect to FIG. 5. The base station BS 110 transmits a pilot signal with an offset A in its service area in a step 801. The Slave MS units 121 and 122 both scan the above pilot signal from the BS 110. Although the Master MS unit 120 also scans the same pilot signal from the BS 110 during the normal mode, the Master MS unit 120 can be switched to the local direct call mode in which the Master MS transmits the Master MS pilot channel signal. A user of the Master MS unit 120 initiates a local direct call by keying the Master MS unit 120 to the local direct call mode in step 802 so as to call the Slave MS unit 121, which is identified as Slave A in a mobile station identification MS_ID.

Still referring to FIG. 8, in the local direct call mode, the following steps or events will take place to establish a local direct call between the Master MS unit 120 and the Slave MS unit 121. The control processor in the Master MS unit 120 in the local direct call mode selects one unused offset value B from a predetermined set of offset values. The RF unit in the Master MS unit 120 transmits a pilot signal with the selected offset value B as a terminal call request in step 803. Concurrently or subsequently, the Master MS unit 120 also transmits a slave mobile station identification MS_ID such as a telephone number and traffic frame synchronization data as overhead information in the sync channel signal in step 804. The Master MS unit 120 simultaneously transmits null data in the traffic channel signal in step 805. Assuming that the Slave MS units 121 and 122 are located within the area where the terminal call request reaches, both Slave MS units 121 and 122 receive the pilot signal with the offset value B and read the content based upon the sync channel signal. The control processor of the Slave MS units 121 and 122 each determines whether or not its own unit is called based upon the telephone number in the mobile station identification MS_ID in steps 806 and 807. As the result of the determination, the Slave MS unit 121 is being called and resumes the following steps to establish a local direct call. On the other hand, the Slave MS unit 122 is not being called and resumes the normal operation in step 807.

To complete the local direct call between the Master MS unit 120 and the Slave MS unit 121, the Slave MS unit 121 sets a preamble such as data "0" in Master MS reverse traffic channel and transmits it back to the Master MS unit 120 in step 809. This transmission enables the Master MS unit 120 to synchronize with the internal clock of the Slave MS unit 121 so as to remove the long code scramble in the traffic channel. Upon receiving the traffic preamble from the Slave MS unit 121, the Master MS unit 120 transmits a BS Ack Order in the traffic channel, which contains a message requesting a acknowledgement in step 810. In response to the BS Ack Order, the Slave MS unit 121 stops the transmission of the null data preamble and starts the null traffic data transmission in step 811. The null traffic data transmission prevents the traffic channel between the Master MS unit 120 and the Slave MS unit 121 from being lost during the above steps. To conclude the establishment of the traffic channel for the local direct call line, the Slave MS unit 812 transmits the MS Ack Order acknowledgment message back to the Master MS unit 120 in step 812. Finally, after the local direct line is established, the Master MS unit 120 discontinues the transmission of the terminal call request pilot signal and starts the transmission of an in-communication display pilot signal in step 814. The in-communication display pilot signal indicates that the pilot signal with an offset value B is currently being used.

Now referring to FIGS. 9(a), 9(b) and 9(c), some examples for pilot signals are shown. FIG. 9(a) illustrates that Walsh function No. 0 is used with all-zero data to generate a pilot signal at the base station. In order to use the same Walsh function for a pilot signal used to initiate a local direct call, the pilot signal is generated with all-one data at the Master MS unit as shown in FIG. 9(b). The above local direct call initiating pilot signal enables the Slave MS units to use the same Walsh function as if the pilot signal is from the base station. However, since an offset value is different from each other in the two pilot signals of FIG. 9(a) and 9(b), the slave MS unit is able to distinguish the transmission source of the two pilot signals. That is, the pilot signal is transmitted from the base station or a Master MS unit. Additionally, the in-communication display pilot signal is also generated with the same Walsh function, but with zero-one data as shown in FIG. 9(c). The above generation of the pilot signals for the local direct call substantially minimizes the effect on the currently used protocol as well as the necessary changes in the system.

FIG. 10 illustrates a table containing exemplary overhead information which is transmitted in the sync channel from the Mater MS unit to the slave MS unit while a local direct call is being established. The overhead information includes a mater identification, a slave identification, long code status information for scrambling data, and common system time information between the Master and Slave MS units. To further illustrate the overhead information, it is assumed that the Master MS unit has a phone number 345 while the Slave MS unit has a phone number 012. To specify the over head information, "00000001" was set in MSG_TYPE. To indicate which Master MS unit is calling, first MASTER_ID_INCLUDED is set to "1" and then NUM_FIELDS is set to "3" for indicating a number of lines. Since the phone number is sent in the DTMF format, DIGIT_MODE is set to "0." According to the DTMF format, the Master MS phone number, "012" is placed in CHAR1=1010, CHAR2=0001 and CHAR3=0010. By the same token, SLAVE_ID_INCLUDED is also set to "1." Similarly, NUM_FIELDS is set to "3" for indicating a number of lines while DIGIT_MODE is set to "0" for indicating the DTMF format. According to the DTMF format, the Slave MS phone number, "345" is placed in CHAR1=0011, CHAR2=0100 and CHAR3=0101. Lastly, LC_STATE and SYS_TIME are respectively set to the long code and the system time of the Master MS unit. Although in the above example, one telephone number is identified for communication, it is possible to implement an additional field to include multiple telephone numbers via traffic channel for a conference call. It is also possible to include a broadcast field to indicate that the data on the traffic channel is broadcasted to every Slave MS units in the transmission range. By the broad cast method, if the data is audio data, a limited radio service is provided. If the data is text data, the transmission path is not relatively high speed, the effect of the transmission on other surrounding units is substantially minimized.

Figure 11:
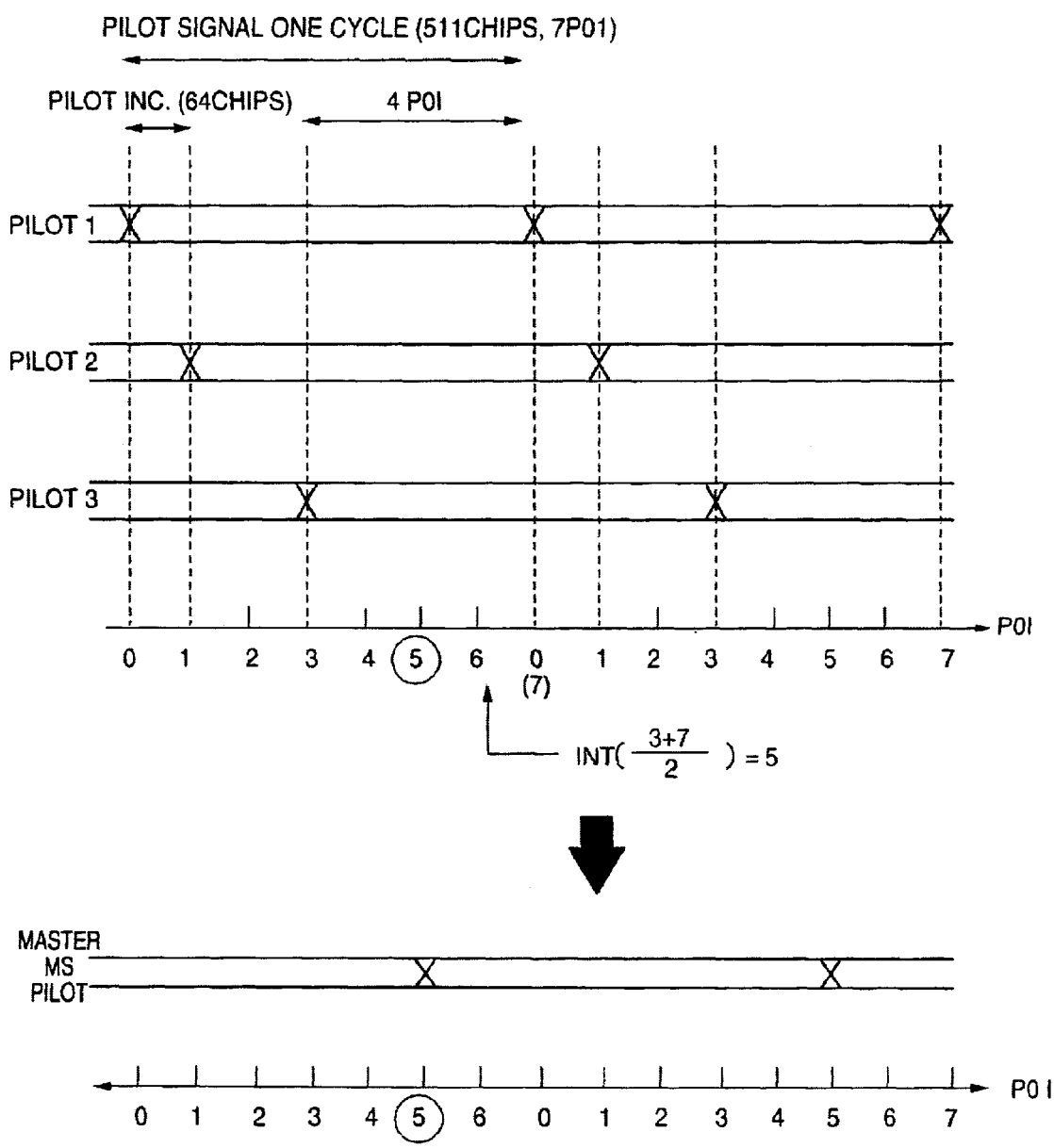
FIG. 11 shows how an offset value in a pilot signal is determined in one preferred process according to the current invention.

Now referring to FIG. 11, an offset value in a pilot signal is determined in one preferred process according to the current invention. In general, the offset value is selected from currently unused ones of predetermined offset values. At the time of the offset value determinations, if no pilot channel is detected, any offset value is used. On the other hand, if offset values are used by base stations as well as other Master MS units already engaged in a local direct call, only unused offset values are available for a new local direct call so as not to disturb other communication links. To determine an appropriate offset value, an offset interval value is defined as a distance between two used offset values that are adjacent with each other. The offset interval value is then compared to a predetermined threshold value. If the offset interval value is equal to or larger than the predetermined threshold value, a middle point of the offset interval is selected as an acceptable offset value. By using the above determined offset value, it is not necessary to synchronize with a base station or other Master MS units already engaged in a local direct call. The above determination of the offset value also controls a number of available local direct calls by adjusting the predetermined threshold value.

Still referring to FIG. 11, to illustrate the above offset value determination, the PN of a frequency 511 chip is used for a pilot channel, and 4×64 chip is assumed as a predetermined threshold value for an offset interval value. 64 chip is a minimal an offset interval value and is also defined as a unit called a pilot offset index (POI). In other words, a predetermined threshold value is 4 POI. It is further illustrated that three pilot channels Pilot 1 through 3 are currently using a corresponding offset value of 0, 1 and three as a result of scanning the surrounding environment. An "X" indicates a leading bit of each pilot channel. To determine an appropriate offset value, an offset interval must be found to have at least 4 POI. One of unused offset intervals between used offsets having at least 4 POI is an interval between offsets 3 and 0 or (7), and this interval has 4 POI. The middle point of this interval is offset 5. Similarly, if the predetermined threshold is set to 2 POI, pilot offsets 2, 4, 5 and 6 are available for establishing a new local direct line in the same environment. On the other hand, if the predetermined threshold is set to 5 POI, no pilot offset is available for establishing a new local direct line in the same environment. As illustrated above, the predetermined threshold value controls a number of newly available local direct calls between mobile units.

To differentiate a pilot channel signal transmitted by a base station from that transmitted by a Master MS unit, there three distinct ways are available. One way is to transmit a unique data in a pilot channel signal as described above with respect to FIGS. 9(a) and 9(b). A second way is to assign certain offset values to the base-originated pilot channel signals while others offset values to the Master MS unit-originated pilot channel signals. A third way is to assign certain radio frequencies to the base-originated pilot channel signals while others radio frequencies to the Master MS unit-originated pilot channel signals.

Figure 12:
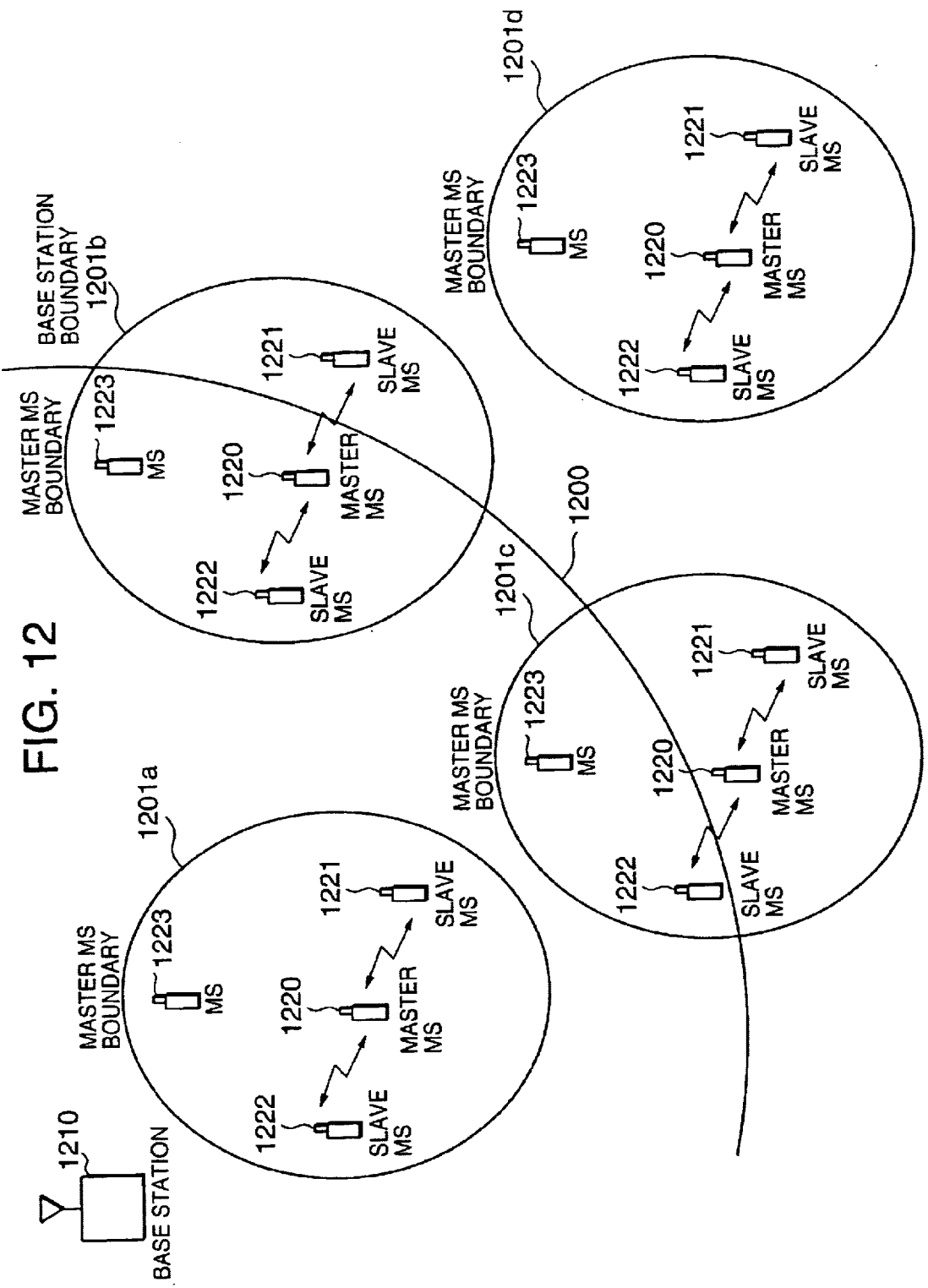
FIG. 12 is a diagram illustrating a second preferred embodiment of the wireless IS-95 standard telecommunication system to provide an option to make a direct local calls between mobile units according to the current invention.

Now referring to FIG. 12, a second preferred embodiment of the wireless or radio IS-95 standard telecommunication system to provide an option to make a direct local calls between mobile units is illustrated according to the current invention. The preferred embodiment includes a base station (BS) 1210 and three types of mobile stations (MS) or terminal communication units 1220, 1221, 1222 and 1223. The BS 1210 offers the mobile telecommunication service for covering a service area 1200 where it can transmit a base station forward link (BS_Fw) to MS units and receives a base station reverse link (BS_Re) from the MS units. A mobile station (MS) 1223 is a unmodified terminal communication unit that is used in normal CDMA-based IS-95 communication and is located inside the service area 100. The MS 1223 receives the BS_Fw from the BS 1210 while it transmits the BS_re to the BS 1210.

Still referring to FIG. 12, the second preferred embodiment of the wireless telecommunication system with an option to make a direct local calls according to the current invention further includes a master mobile station (Master MS) 1220 and a slave mobile stations (Slave MS) 1221 and 1222. The Master MS unit 1220 receives the BS_Fw from the BS 1210 while it transmits the BS_Re to the BS 1210. In addition, the Master MS unit 1220 is equipped to transmit a master mobile station forward link (MMS_Fw) to the Slave MS 1221, 1222 within a Master MS boundary area 1201*a*, 1201*b*, 1201*c* and 1201*d*. The Master MS 1220 is also equipped to receive a master mobile station reverse link (MMS_Re) from the Slave MS units 1221, 1222. The MMS_Fw contains a pilot signal indicating that it is for a direct local communication channel between two mobile stations. The Slave MS 1221, 1222 are designed to interact with the Master MS 1220 during the local direct communication. If the Slave MS unit 1221 or 1222 is also capable of initiating a local direct call, the Slave MS unit 1221 or 1222 is functionally and structurally identical to the Master MS unit 1220. In the identical units, the functions and structures in the MS units 1220, 1221, 1222 are switched between a master mode and a slave mode by software. In the alternative, if the Slave MS units 1221, 1222 is not capable of initiating a local direct call, the Slave MS 121 may lack certain functions and structures of the Master MS 1220.

The above described terminal-to-terminal direct communication takes place inside as well as outside the base station service area 1200. The Master MS 1220, the Slave MS 1221 and the Slave MS 1222 are all located in the base station service area 1200 when the Master MS 1220 transmits signals within the Master MS boundary areas 1201*a*. The Master MS 1220 is located within the base station service area 1200 while the Slave MS 1222 and the Slave MS 1221 are located near the base station service area boundary 1200 when the Master MS 1220 transmits signals within the Master MS boundary areas 1201*b*. In contrast, the Master MS 1220 is located outside the base station service area 1200 while the Slave MS 1221 and the Slave MS 1222 are located near the base station service area 1200 when the Master MS 1220 transmits signals within the Master MS boundary areas 1201*c*. Lastly, the Master MS 1220, the Slave MS 1221 and the Slave MS 1222 are all located outside the base station service area 1200 when the Master MS 1220 transmits signals within the Master MS boundary areas 1201*d*.

In general, in order to establish a local direct calls between the Master MS unit 1220 and the Slave MS units 1221 and 1222, FIG. 12 illustrates that the Master MS 1220 transmits a terminal call pilot or a master mobile station pilot signal (MMS pilot) within Master MS boundary area 1201. According to a predetermined protocol such as the IS-95 standard, the Slave MS units 1221 and 1222 register their locations or hand off with the Master MS 1220. The Slave MS units 1221 and 1222 then remain in an idle state where either the Master MS unit 1220 or the Slave MS unit 1221 or 1222 initiates a local direct call. Conceptually speaking, by the Slave MS units 1221 and 1222, the Master MS unit 1220 is perceived as another base station which transmits a terminal call request pilot signal. In other words, the Master MS unit 1220 does not require the Slave MS units 1221 and 1222 to operate in a substantially different manner in responding to the terminal call pilot signal except for determining the transmission origin of the pilot signal. After the local direct call is established between the Master MS unit 1220 and the Slave MS units 1221 and 1222, the same Mater MS 1220 transmits a in-communication display pilot signal instead of the MMS pilot so that the local direct communication is not interfered by other Master MS units.

Figure 13:
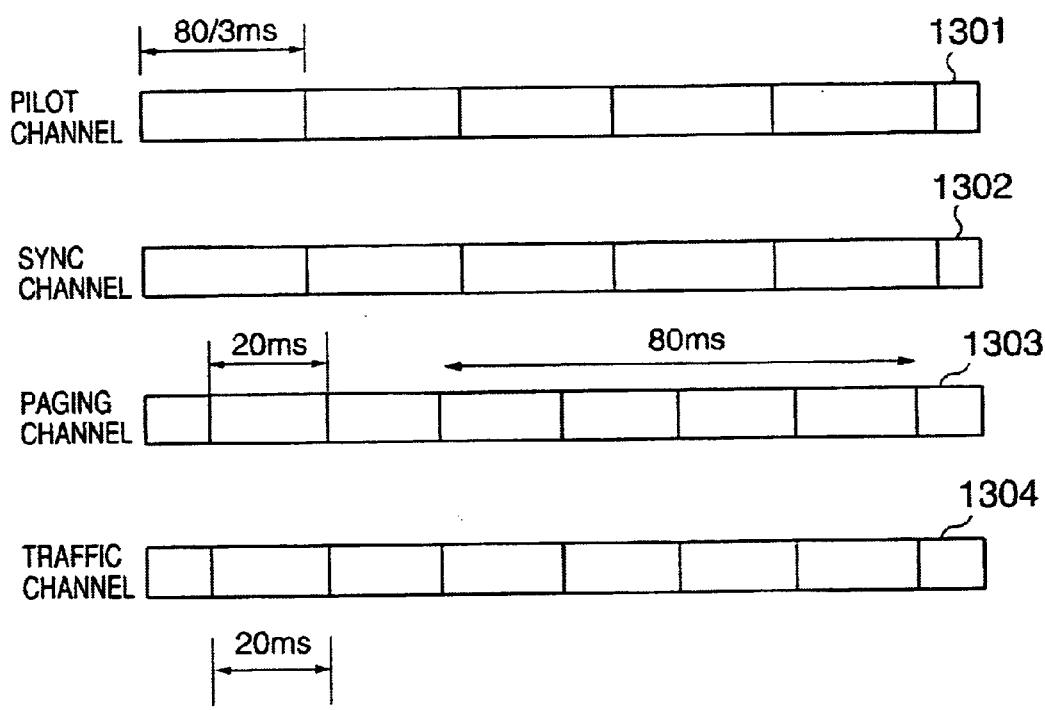
FIG. 13 is a diagram illustrating channels in a Master MS (MMS) forward link transmission.

Now referring to FIG. 13, a Master MS (MMS) forward link transmission channels include a MMS pilot channel 1301 for transmitting a MMS pilot signal for transmitting a between terminal communication request, a MMS paging channel 1303 for communicating with Slave MS units registered with the Master MS unit, a MMS traffic channel 1304 for transmitting traffic data in a local direct call and a sync channel 1302 for helping the synchronization of the frames in the MMS paging channel 1303 and the MMS traffic channel 1304. In order to minimize any modification to a Slave MS units in implementing a local direct call, the timing and the frame length of the pilot channel 1301 and the traffic channel 1304 are compatible with those of the IS-95 protocol. In order to read from the channels from the MMS forward link, the Slave MS unit initially synchronizes with the pilot channel. The pilot channel according to the IS-95 protocol is spread by $2^{15}$ bits per 80/3 ms psuedo-random noises (PN), and the pilot channel 1301 of the preferred embodiment also uses the same type of PN. The traffic channel 1304 and the paging channel 1303 have the frame length of 20 ms. A MMS reverse link transmission channels include a MMS access channel for transmitting a common message among Slave MS units registered under the Master MS unit and a MMS traffic channel for transmitting data in a local direct call.

Figure 14:
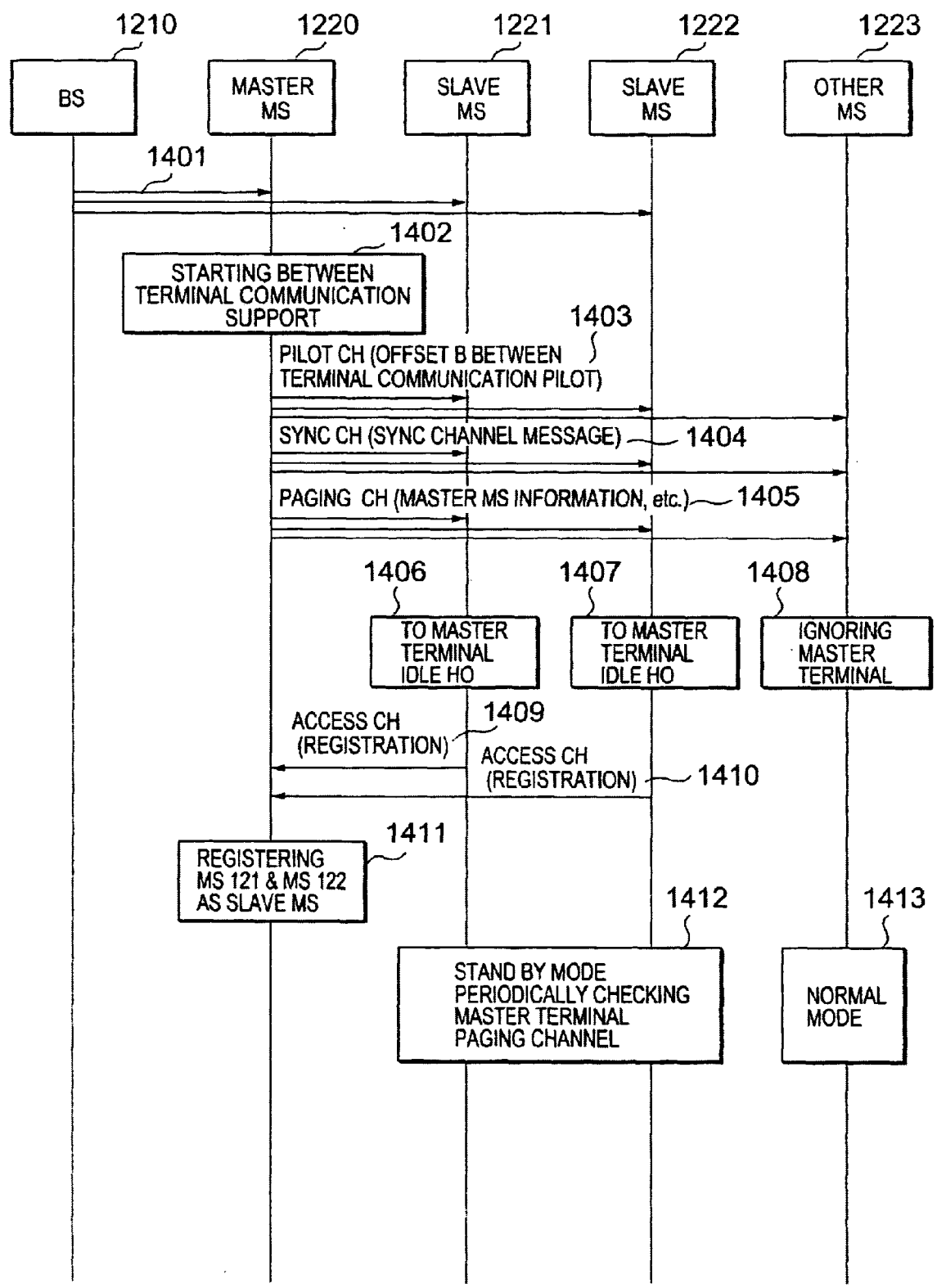
FIG. 14 is a pseudo timing chart illustrating chronological relationships of the acts at the BS unit, the Master MS unit, the two Slave MS units and the MS unit as above described with respect to FIG. 12.

Now referring to FIG. 14, a pseudo timing chart illustrates chronological relationships of the acts at the BS unit 1210, the Master MS unit 1220, the two Slave MS units 1221, 1222 and the MS unit 1223 as above described with respect to FIG. 12. The BS unit 1210 transmits a BS pilot signal with an offset value A in step 1401. The BS unit 1210 uses a unique encoding scheme such as a Walsh function No. 0 and transmits data of continuous zeroes. The Slave MS units 1221, 1222 intermittently monitor the BS pilot signal. The Master MS unit 1220 has two modes including a normal operation mode and a local direct call mode. On the other hand, the Slave MS units 1221, 1222 have three modes including the normal operation mode, a standby mode and the direct call mode. In the normal operation mode, the units receive a call service via the above described pilot signal with the offset value A from the BS unit 1210. In the direct call mode, the units are engaged in a local direct call between the Master MS unit 1220 and at least one of the Slave MS units 1221, 1222. The standby mode is a state where the Slave MS units 1121 and 1222 are registered with the Master MS unit 1220 and wait for a local direct call. When the Slave MS units 1221, 1222 in the normal operation mode detect a between terminal communication pilot signal, the Slave MS units 1221, 1222 may their mode to the standby mode base upon a user input. The Slave MS units 1221, 1222 in the standby mode can switch their mode back to the normal operation mode at any time base upon a user input.

Still referring to FIG. 14, this timing chart describes a situation where the Master MS unit 1220 initiates a local direct call to the Slave MS units 1221, 1222 in step 1402. In establishing the local direct call, the Master unit 1220 transmits the Slave MS unit 1221 the Master MS forward link which includes the pilot channel signal, the sync channel signal, and the paging channel signal as shown in steps 1403, 1404 and 1405. A Sync Channel Message similar to that of IS-95 is transmitted so that the paging channel from the Master MS unit 1220 can be read in the step 1404. Furthermore, the paging channel transmits overhead information on the Master MS unit 1220 in the step 1405. Upon detecting the MS pilot signal, in order to register with the Master MS unit 1220, the Slave MS units 1221, 1222 respectively perform idle hand off (idle HO) in corresponding steps 1406 and 1407. These steps are either automatically triggered or user specified. To alert the user for the reception of the MMS pilot signal, either a visual display or an audible sound may be generated at a Slave MS unit. The MS unit 1223 continues its normal operation mode and ignores the Master MS unit as shown in steps 1408 and 1413.

After the Slave MS units 1221, 1222 having performed the hand off, the Slave MS units 1221, 1222 report to the Master MS unit 1220 that they are under control of the Master MS unit 1220 by transmitting a Registration Message via each Master MS access channel in steps 1409 and 1410. In response to the Registration Message, the Master MS unit 1220 recognizes the Slave MS units 1221, 1222 based upon a slave identification such as ESN and IMSI to enable a local direct call. The Master MS unit 1220 registers the Slave MS units 1221, 1222 at its own register in step 1411 so that the Slave MS units 1221, 1222 change their mode to the standby mode. In the standby mode, the Slave MS units 1221, 1222 commence the monitoring of the paging channel base upon the information transmitted in the sync channel in step 1412. The Slave MS units 1221, 1222 in the standby mode are also capable of initiating a local direct call to the Master MS unit 1220.

Figure 15:
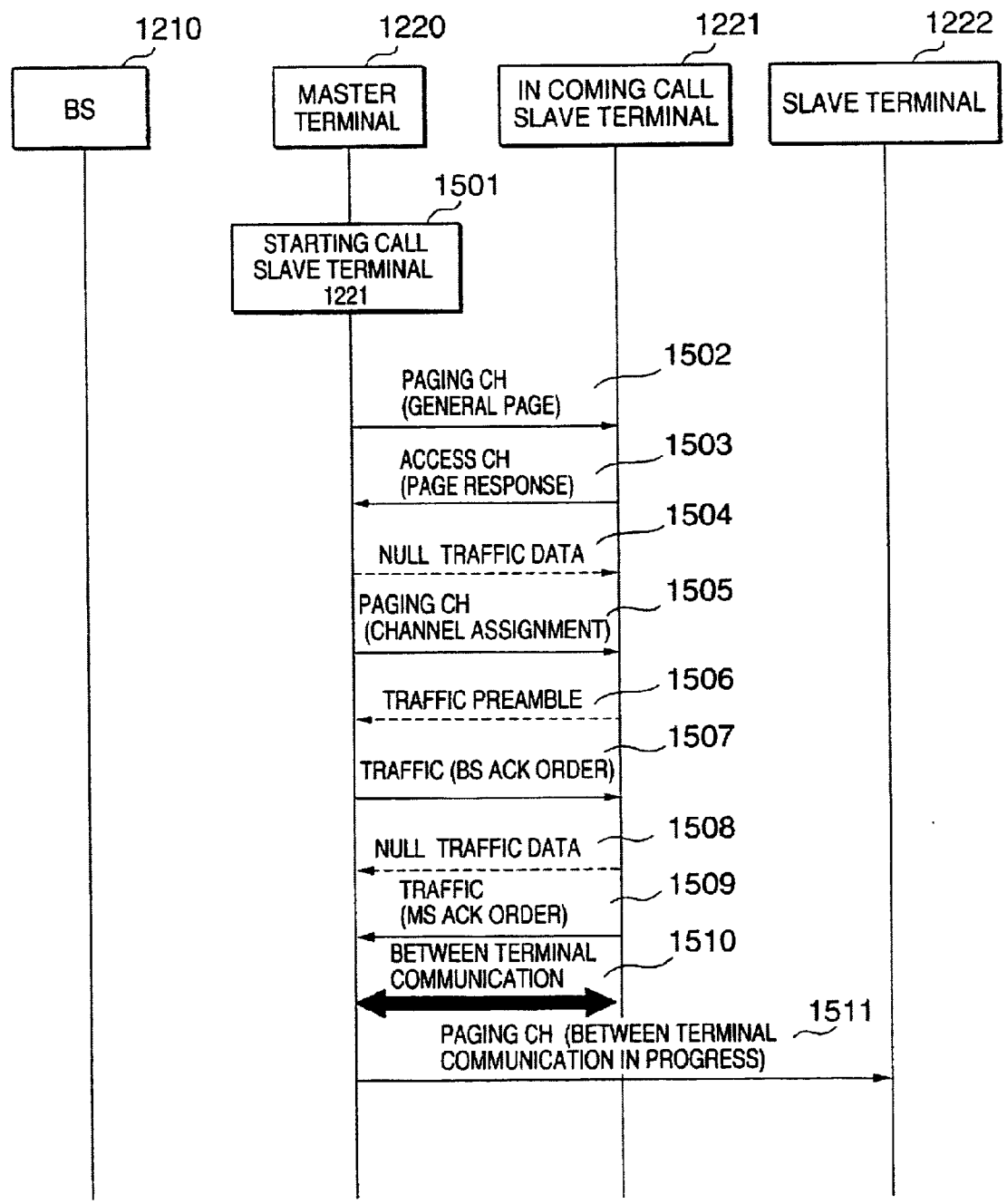
FIG. 15 is a pseudo timing chart illustrating that the Master MS unit initiates a local direct call to the Slave MS unit.

Now referring to FIG. 15, while the Slave MS units 1221, 1222 are in the standby mode, the Master MS unit 1220 initiates a local direct call to the Slave MS unit 1221 in step 1501. The following steps or events will follow the step 1501 to complete the establishment of the local direct call. The Master MS unit 1220 transmits a General Page Message in the paging channel in step 1502. In response to the General Page Message, the Slave MS unit 1221 transmits a Page Response Message in the access channel in step 1503. After confirming the Page Response Message, the Master MS unit 1220 starts transmitting Null traffic data in the Master MS forward link traffic channel in step 1504 in order to keep the traffic channel alive and prevent it from being lost. Then, the Master MS unit 1220 transmits via paging channel a Channel Assignment Message containing traffic channel information assigned to the Slave MS unit 1221 in step 1505. Based upon the information in the Channel Assignment Message from the Master MS unit 1220, the Slave MS unit 1221 commences the monitor of the Master MS forward traffic channel as well as the transmission of continuous zeroes in a preamble in the Master MS reverse traffic channel in step 1506. After the completion of the capture of the Master MS reverse traffic channel, the Master MS unit 1220 transmits a BS Ack Order via Master MS forward traffic channel in step 1507. Upon receiving the BS Ack Order, the Slave MS unit 1221 discontinues the transmission of the zero-filled preamble and transmits the Null traffic data in step 1508 as well as a MS Ack Order in step 1509. As a result of the above transmissions, the traffic channel between the Master MS unit 1220 and the Slave MS unit 1221 is finally enabled for communication in step 1510. The Master MS unit 1220 transmits via paging channel an in-communication message to all other Slave MS units including 1222 in the standby mode which registered with the Master MS unit 1220 in step 1511. The above in-communication message indicates to other standby Slave MS units that the Master MS unit 1220 is already engaged in communication and is not available.

Figure 16:
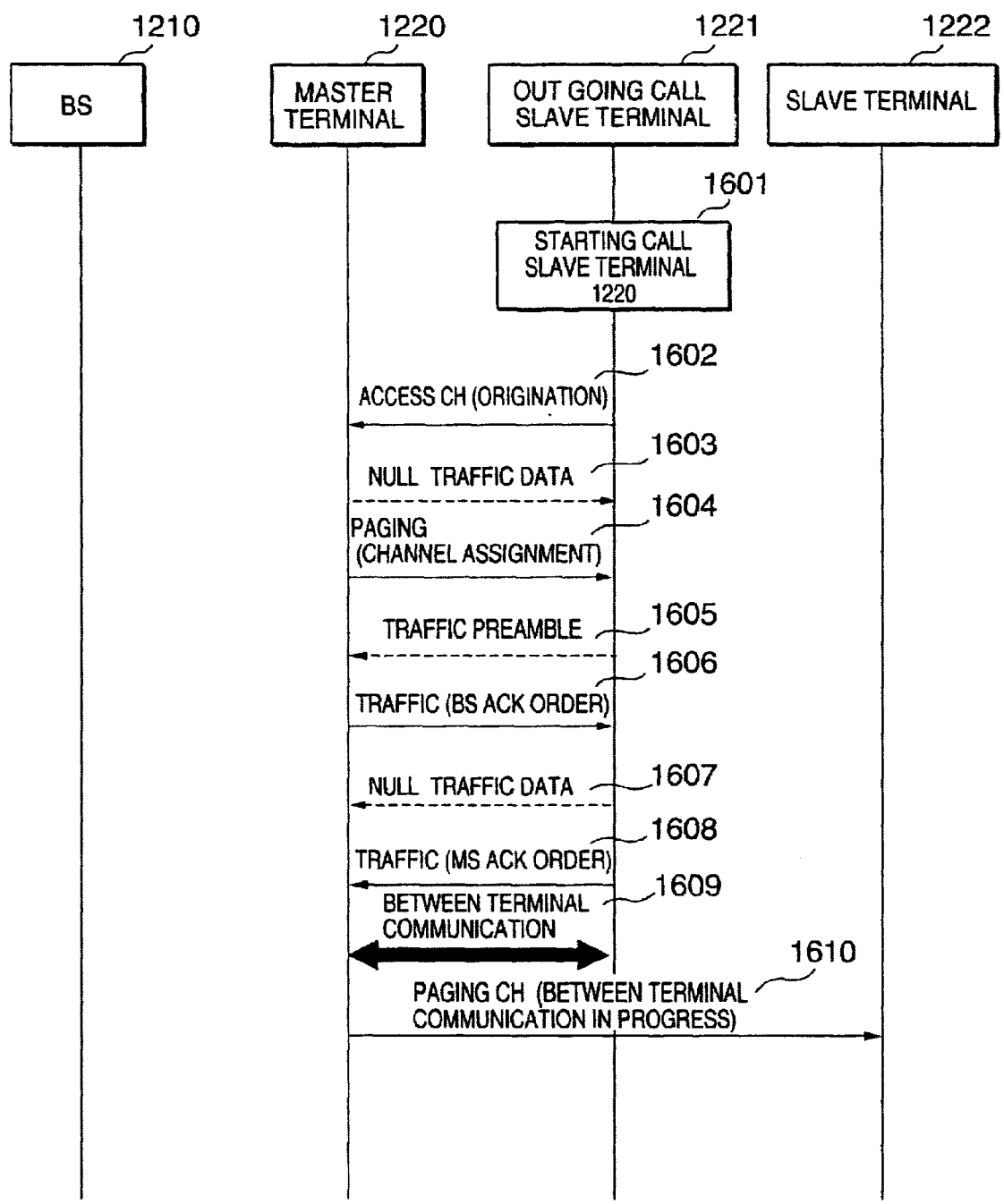
FIG. 16 is a pseudo timing chart illustrating that the Slave MS unit in the standby mode initiates a local direct call to the Master MS unit.

Now referring to FIG. 16, the Slave MS unit 1221 in the standby mode initiates a local direct call to the Master MS unit 1220 in step 1601. The following steps or events will follow the step 1601 to complete the establishment of the local direct call according to the IS-95 protocol. The Slave MS unit 1221 transmits the Master MS unit 1220 an Origination Message in the access channel in step 1602. In order to make the steps compatible with the IS-95 protocol, when the Slave MS unit 1221 initiates a local direct call to the Master MS unit 1220, the Origination Message includes a destination MS identification such as the telephone number of the Master MS unit 1220. Upon receiving the Origination Message from the Slave MS unit 1221, the Master MS unit 1220 commences the transmission of Null traffic data in the Master MS forward traffic channel in step 1603 in order to keep the traffic channel alive and prevent it from being lost. Then, the Master MS unit 1220 transmits via paging channel a Channel Assignment Message containing traffic channel information assigned to the Slave MS unit 1221 in step 1604. Based upon the information in the Channel Assignment Message from the Master MS unit 1220, the Slave MS unit 1221 commences the monitor of the Master MS forward traffic channel as well as the transmission of continuous zeroes in a preamble in the Master MS reverse traffic channel in step 1605. After the completion of the capture of the Master MS reverse traffic channel, the Master MS unit 1220 transmits a BS Ack Order via Master MS forward traffic channel in step 1606. Upon receiving the BS Ack Order, the Slave MS unit 1221 discontinues the transmission of the zero-filled preamble and transmits the Null traffic data in step 1607 as well as a MS Ack Order in step 1608. As a result of the above transmissions, the traffic channel between the Master MS unit 1220 and the Slave MS unit 1221 is finally enabled for communication in step 1609. The Master MS unit 1220 transmits via paging channel an in-communication message to all other Slave MS units including 1222 in the standby mode which registered with the Master MS unit 1220 in step 1610. The above in-communication message indicates to other standby Slave MS units that the Master MS unit 1220 is already engaged in communication and is not available.

Figure 17:
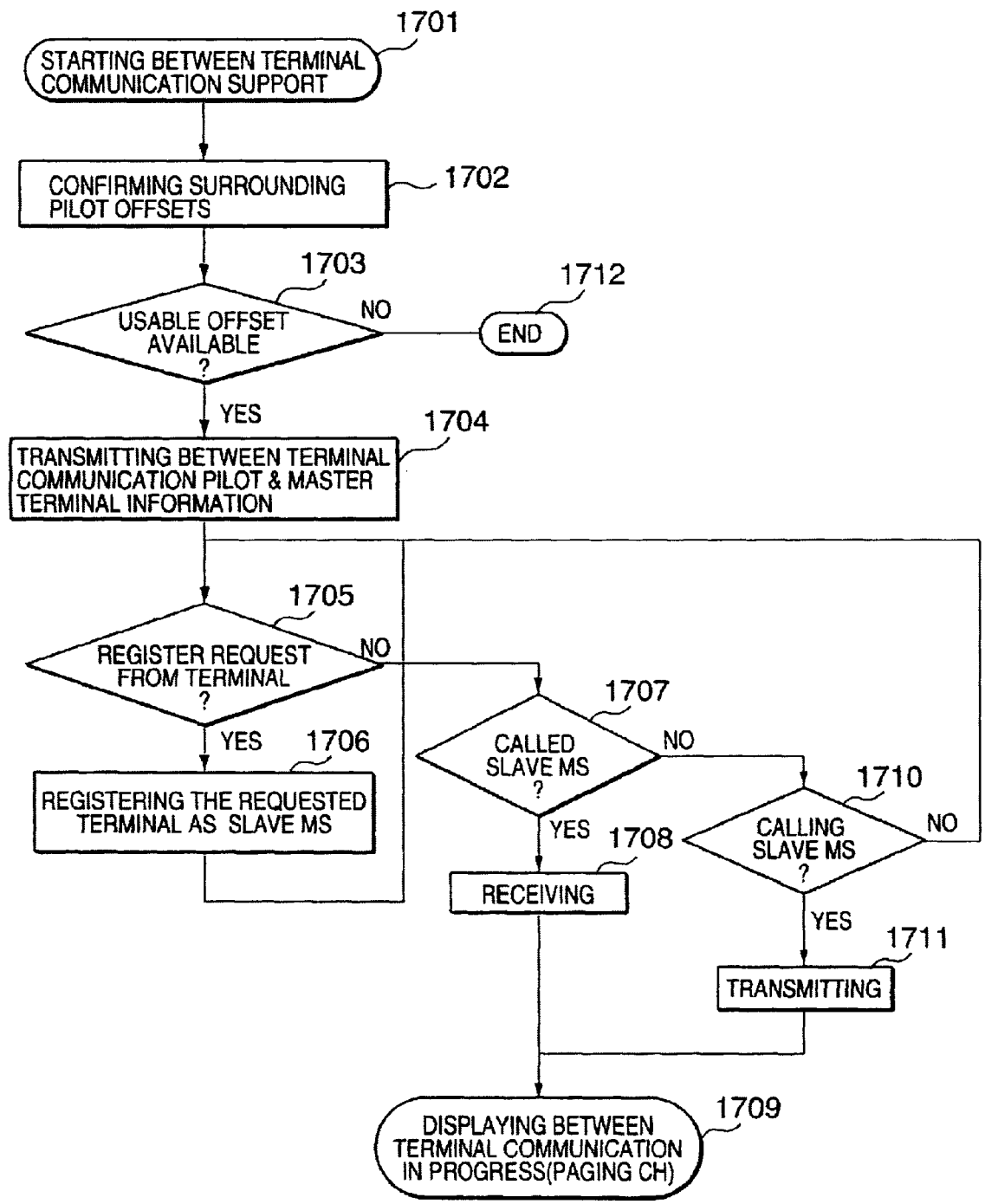
FIG. 17 is a flow chart illustrating acts involved in a second preferred process of optionally establishing a direct local call between mobile terminals at a Master MS unit according to the current invention.

Now referring to FIG. 17, a flow chart illustrates acts involved in a second preferred process of optionally establishing a direct local call between mobile terminals at a Master MS unit according to the current invention. Upon receiving a local direct terminal call request from a user in act 1701, a Master MS unit determines currently used offset values in the pilot channel in the surrounding environment and stores in a memory unit the information on the used and unused offset values in act 1702. In act 1703, a control processor selects one of the unused offset values. Using the selected unused offset value, the Master MS unit transmits an in-between direct terminal call request pilot signal as well as information on the Slave MS unit via paging channel and information on frame synchronization via synchronization channel in an act 1704. On the other hand, if no offset value is currently available, the preferred process indicates that no direct terminal call is available and ends in step 1712. The failing result may be audibly or visually communicated to the user from the Master MS unit.

Still referring to FIG. 17, if the Master MS unit detects registration information from Slave MS units in step 1705, it registers the Slave MS units at a memory unit in step 1706. The preferred process returns to the step 1705 from the registration step 1706. When there is no request for the registration from Slave MS units, the Master MS unit determines whether or not one of the registered Slave MS units initiates a local direct call to the Master MS unit in step 1707. If a Slave MS unit initiates a local direct call, the Master MS unit starts a predetermined set of steps to establish a local direct call with the Slave MS unit in step 1708. After the local direct line is established, the Master MS unit transmits to other Slave MS units via paging channel a signal indicating that the Master MS unit is engaged in communication in step 1709. When there is no initiation of the local direct call by a Slave MS unit in the step 1707, the Master MS unit initiates a local direct call to one of the registered Slave MS units in step 1710. If the Master MS does not initiate a local direct call to a Slave MS unit, the process returns to the step 1705. On the other hand, if the Master MS initiates a local direct call to a Slave MS unit, the control processor reads a list of Slave MS identifications such as telephone numbers and user names from the memory unit and displays the list. The Master MS control processor waits for a user input such as a key input or a voice command. In response to the user input, the Master MS unit initiates a local direct call to the selected Slave MS unit in step 1711. After the local direct line is established, the Master MS unit transmits to other Slave MS units via paging channel a signal indicating that the Master MS unit is engaged in communication in step 1709.

Now referring to FIG. 18, a flow chart illustrates acts involved in a second preferred process of optionally establishing a direct local call between mobile terminals at a Slave MS unit according to the current invention. Assuming that the Slave MS unit is able to distinguish a terminal call pilot signal of a Mater MS unit from a BS pilot signal of a base station, in a MS idle state, the Slave MS unit searches or scans for a terminal call pilot signal from the Master MS unit in an act 1801. Upon detecting the terminal call pilot signal in an act 1802, a control processor determines in an act 1803 whether or not the Slave MS unit will be engaged in a local direct call. If no local direct call is to be made, the preferred process returns to the step 1801. On the other hand, to make a local direct call, in step 1804, the slave MS unit performs a hand off and gets ready for receiving data on the paging channel by synchronizing the paging channel via paging channel and the pilot channel from the Master MS unit. Finally, in the step 1804, after registering the Slave MS unit, the Slave MS unit reports to the Master MS unit that the local direct call is established. In a step 1805, the Slave MS unit periodically monitors or scans the paging channel. When the Master MS unit 1806 initiates a local direct call to the Slave MS unit in step 1806, a predetermined set of steps to establish a local direct call is performed in step 1807. When there is no direct call request from the Master MS unit in the step 1806 and the Slave MS unit does not initiate a local direct call to the Master MS unit in step 1809, the preferred process returns to the step 1805 to scan the paging channel. However, when there is no direct call request from the Master MS unit in the step 1806 but the Slave MS unit initiates a local direct call to the Master MS unit in the step 1809, the Slave MS unit determines whether or not the Master MS unit is already engaged in communication in step 1810. Only when the Master MS unit is not engaged in communication, the Slave MS unit continues to establish a local direct call with the Master MS unit in step 1811. However, if the Master MS unit is already engaged in communication, the preferred process returns to the step 1805.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes such as in multiple access techniques including TDMA and FDMA are within the principles of the invention to the full extent indicated by the broad general meaning of the terms in which the appended claims are expressed.

What is claimed is:

1. A method of providing an optional direct communication between terminal communication units according to code division multiple access which is also used for communication between the terminal communication units via a base station in a communication network, comprising the acts of:

a) searching currently used identification information for said code division multiple access identifying the base station surrounding a first terminal communication unit, said identification information being assigned from a set of predetermined unique identifiers, the base station having a base service area;

b) selecting an unused one of said predetermined unique identifiers as a temporary unique identifier for direct communication between the first terminal communication unit and a second terminal communication unit; and c) establishing said direct communication between said first terminal communication unit and said second terminal communication unit according to said code division multiple access using said temporary unique identifier regardless of a relative position of said first terminal communication unit and said second terminal communication unit with respect to the base service area.

2. The method of providing an option to communicate directly between terminal communication units according to claim 1 wherein said first terminal communication unit and said second terminal communication unit are within a predetermined distance with each other.

3. The method of providing an option to communicate directly between terminal communication units according to claim 1 wherein said identification information includes any combination of an offset value for a pilot signal, a frequency value of a pilot signal and pilot channel data in a pilot signal.

4. The method of providing an option to communicate directly between terminal communication units according to claim 3 wherein said step c) further comprising:

transmitting said pilot signal with a second offset value from said first terminal communication unit, said base station transmitting said pilot signal with a first offset value;

determining at said second terminal communication unit whether or not said pilot signal is sent from said first terminal communication unit based upon said second offset value and whether or not said second terminal communication unit is being called; and transmitting a reply signal from said second terminal communication unit to said first terminal communication unit.

5. The method of providing an option to communicate directly between terminal communication units according to claim 1 wherein a first base has a first service area where said first terminal communication unit is located in said first service area, said step a) determining said currently used identification information within said first service area of said first base for said code division multiple access surrounding said first terminal communication unit.

6. The method of providing an option to communicate directly between terminal communication units according to claim 1 wherein said currently used identification information identifies said direct communication between said terminal communication units.

7. The method of providing an option to communicate directly between terminal communication units according to claim 1 wherein said currently used identification information identifies said communication between said terminal communication units via said base station.

8. The method of providing an option to communicate directly between terminal communication units according to claim 3 wherein said step c) further comprising:

broadcasting said pilot signal with a second offset value from said first terminal communication unit, said base station transmitting said pilot signal with a first offset value;

registering said second terminal communication unit at said first terminal communication unit; and periodically monitoring at said second terminal communication unit said pilot signal with said second offset from said first terminal communication unit.

9. The method of providing an option to communicate directly between terminal communication units according to claim 8 wherein after establishing said direct communication between said first terminal communication unit and said second terminal communication unit, said first terminal communication unit transmits a pilot signal indicating that said direct communication in progress.

10. The method of providing an option to communicate directly between terminal communication units according to claim 1 wherein said step b) further comprising:

determining whether or not said selected unused one of said predetermined unique identifiers has a predetermined amount of distance from a used one of said of predetermined unique identifiers; and based upon said distance determination, said step c) establishes said direct communication.

11. The method of providing an option to communicate directly between terminal communication units according to claim 1 wherein said direct communication between said first terminal communication unit and said second terminal communication unit is established when communication between said first terminal communication unit and said second terminal communication unit is not available via the base station.

12. The method of providing an option to communicate directly between terminal communication units according to claim 1 wherein the communication between said first terminal communication unit and said second terminal communication unit is established via the base station when said direct communication between said first terminal communication unit and said second terminal communication unit is not available.

13. A system for providing an optional direct communication between terminal communication units according to code division multiple access which is also used for communication between the terminal communication units via a base station in a communication network, comprising:

a first terminal communication unit which searches currently used identification information for said code division multiple access identifying the base station surrounding said first terminal communication unit, said identification information being assigned from a set of predetermined unique identifiers, said first terminal communication unit selecting an unused one of said predetermined unique identifiers as a temporary unique identifier, the base station having a base service area; and a second terminal communication unit which is capable of communicating with said first terminal communication unit via the base station, said first terminal communication unit and said second terminal communication unit establishing said direct communication between said first terminal communication unit and said second terminal communication unit according to said code division multiple access using said temporary unique identifier regardless of a relative position of said first terminal communication unit and said second terminal communication unit with respect to the base service area.

14. The system for providing an option to communicate directly between terminal communication units according to claim 13 wherein said first terminal communication unit and said second terminal communication unit are within a predetermined distance with each other.

15. The system for providing an option to communicate directly between terminal communication units according to claim 13 wherein said identification information includes any combination of an offset value for a pilot signal, a frequency value of a pilot signal and pilot channel data in a pilot signal.

16. The system for providing an option to communicate directly between terminal communication units according to claim 13 wherein a first base has a first service area where said first terminal communication unit is located, said first terminal communication unit determining said currently used identification information within said first service area of said first base for said code division multiple access surrounding said first terminal communication unit.

17. The system for providing an option to communicate directly between terminal communication units according to claim 13 wherein said currently used identification information identifies said direct communication between said terminal communication units.

18. The system for providing an option to communicate directly between terminal communication units according to claim 13 wherein said currently used identification information identifies said communication between said terminal communication units via said base station.

19. The system for providing an option to communicate directly between terminal communication units according to claim 13 wherein said first terminal communication unit determines whether or not said selected unused one of said predetermined unique identifiers has a predetermined amount of distance from a used one of said of predetermined unique identifiers, based upon said distance determination, said first terminal communication unit establishing said direct communication.

20. The system for providing an option to communicate directly between terminal communication units according to claim 13 herein said direct communication between said first terminal communication unit and said second terminal communication unit is established when communication between said first terminal communication unit and said second terminal communication unit is not available via the base station.

21. The system for providing an option to communicate directly between terminal communication units according to claim 13 wherein the communication between said first terminal communication unit and said second terminal communication unit is established via the base station when said direct communication between said first terminal communication unit and said second terminal communication unit is not available.

22. A wireless terminal communication device which communicates with a second terminal communication device via a base station as well as which directly communicates with the second terminal communication device without the base station, comprising:
   a receiver which receives a transmission signal from the base station and the second terminal communication device;
   a searching circuit being connected to said receiver and searching for used identification information identifying the base station based upon CDMA surrounding said wireless terminal communication device, said used identification information being assigned from a set of predetermined identifiers, the base station having a base service area;
   a selector circuit being connected to said searching circuit and selecting an unused one of said predetermined identifiers;
   a transmitter being connected to said selector and transmitting said unused identification information; and
   a line establishing circuit connected to said receiver and said transmitter for establishing a communication line with the second terminal communication device according to said CDMA after said unused identification information is transmitted regardless of a relative position of said wireless terminal communication device and the second terminal communication device with respect to the base service area.

23. The wireless terminal communication device according to claim 22 wherein said receiver further includes a forward link receiver which receives a forward link signal from the base station and a reverse link receiver which receives a reverse link signal from the second terminal communication device, said transmitter further including a forward link transmitter which transmits a forward link signal to the second terminal communication device and a reverse link transmitter which transmits a reverse link signal to the base station.

24. The wireless terminal communication device according to claim 22 wherein said used identification information and said unused identification information are respectively a diffusion code with a unique offset value used for pilot channel diffusion.

25. The wireless terminal communication device according to claim 24 further comprising an information generation circuit which is connected to said transmitter and generates an information signal indicative of specifying the second terminal communication device in initiating a call with the second terminal communication device, said transmitter transmitting said information signal via a channel other than a pilot channel.

26. The wireless terminal communication device according to claim 24 further comprising a hand off circuit which is connected to said line establishing circuit and hands off the second terminal communication device to the first terminal communication device, upon a successful handing off of the second terminal communication device, said line establishing circuit establishing the communication line.

27. The wireless terminal communication device according to claim 26 further comprising an information generation circuit which is connected to said transmitter and generates an information signal indicative of specifying the second terminal communication device in initiating a call with the second terminal communication device, said transmitter transmitting the information signal via a paging channel.

28. The wireless terminal communication device according to claim 22 herein said line establishing circuit directly establishes the communication line with the second terminal communication device when the communication line with the second terminal communication device is not available via the base station.

29. The wireless terminal communication device according to claim 22 wherein said line establishing circuit establishes the communication line with the second terminal communication device via the base station when the communication line with the second terminal communication device is not available.

* * * * *